(12) United States Patent
Fisher et al.

(10) Patent No.: US 10,075,542 B2
(45) Date of Patent: Sep. 11, 2018

(54) METHODS AND SYSTEMS FOR DYNAMIC EXECUTION OF ACTIONS IN RESPONSE TO COMMUNICATIONS EVENTS OF ONE OR MORE COMMUNICATIONS PROTOCOLS

(71) Applicant: TJD Enterprises, Inc., Raleigh, NC (US)

(72) Inventors: Anthony Fleet Fisher, Raleigh, NC (US); Jaime Adam Meritt, Raleigh, NC (US)

(73) Assignee: TJD Enterprises, Inc., Raleigh, NC (US)

( * ) Notice: Subject to any disclaimer, the term of this patent is extended or adjusted under 35 U.S.C. 154(b) by 0 days.

(21) Appl. No.: 15/487,522

(22) Filed: Apr. 14, 2017

(65) Prior Publication Data
US 2017/0223121 A1  Aug. 3, 2017

Related U.S. Application Data

(63) Continuation of application No. 14/947,700, filed on Nov. 20, 2015, now Pat. No. 9,674,124.

(60) Provisional application No. 62/147,905, filed on Apr. 15, 2015.

(51) Int. Cl.
G06F 15/16 (2006.01)
H04L 29/08 (2006.01)
G06Q 30/02 (2012.01)
H04L 29/06 (2006.01)
H04L 12/58 (2006.01)

(52) U.S. Cl.
CPC ......... H04L 67/18 (2013.01); G06Q 30/0269 (2013.01); G06Q 30/0275 (2013.01); H04L 51/32 (2013.01); H04L 69/18 (2013.01)

(58) Field of Classification Search
CPC .................................................. G06Q 10/06
USPC .......... 709/202–206, 217–219, 230; 705/300
See application file for complete search history.

(56) References Cited

U.S. PATENT DOCUMENTS 9,674,124 B1 * 6/2017 Fisher .................. H04L 51/066

\* cited by examiner

*Primary Examiner* — Bharat N Barot
(74) *Attorney, Agent, or Firm* — NK Patent Law, PLLC

(57) ABSTRACT

According to one aspect, the subject matter described herein includes a method for dynamic execution of actions in response to communications events of one or more communications protocols that are generated in response to a variety of triggers. The method includes, at an event clearinghouse for receiving communications events, receiving a communications event that is associated with a trigger, the communications event having a first communication protocol, identifying an action to take in response to the communications event, identifying a target for the action, and initiating the identified action by or on behalf of the identified target, wherein the event clearinghouse supports a plurality of communications protocols.

18 Claims, 17 Drawing Sheets

METHODS AND SYSTEMS FOR DYNAMIC EXECUTION OF ACTIONS IN RESPONSE TO COMMUNICATIONS EVENTS OF ONE OR MORE COMMUNICATIONS PROTOCOLS

CROSS-REFERENCE TO RELATED APPLICATIONS

This application is a continuation of U.S. patent application Ser. No. 14/947,700 filed on Nov. 20, 2015, which claims priority to U.S. Provisional Patent Application No. 62/147,905 filed on Apr. 15, 2015, the entire contents of which are incorporated herein.

TECHNICAL FIELD

This disclosure relates to dynamic execution of actions in response to communications events. More specifically, it relates to dynamic execution of actions in response to communications events of one or more communications protocols that are generated in response to a variety of triggers (e.g., visual, near field, or radio).

BACKGROUND

While it may be desirable both from a consumer's perspective and an advertiser or manufacturer's perspective, it is often difficult to successfully integrate different portable communications protocols for things such as social networking, smart posters, discounts, item tracking, and many more.

Typically, events or actions are statically associated with a particular communications protocol, such as detecting the presence of an Near Field Communication ("NFC device" e.g., NFC tag) in proximity to an NFC reader (e.g., NFC-capable smartphone) and displaying a webpage on the NFC reader. With the widespread adoption and resulting decreased cost of various portable communications sources such as Wi-Fi, Bluetooth, NFC, and QR codes, it has become more difficult to create systems that support or work across a multitude of communications protocols in an efficient manner for the benefit of consumers in a variety of scenarios.

Accordingly, a need exists for dynamic execution of actions in response to communications events of one or more communications protocols that are generated in response to a variety of triggers (e.g., visual, near field, or radio), independent of communications protocol.

SUMMARY

The subject matter disclosed herein includes methods, systems, and computer program products for dynamic execution of actions in response to communications events of one or more communications protocols that are generated in response to a variety of triggers, independent of communications protocol. Because the methods, systems, and computer program products described herein support events in one or more communications protocols, actions may be taken in response to a wide variety of triggers.

As used herein, the term "trigger" refers to a condition that is detected, and the term "event" refers to a message or other action generated in response to the trigger. Events may also be generated in response to other events or conditions. An event that is generated in response to a trigger is referred to as a "base event".

As used herein, the term "event stream" refers to a set of events that may be somehow related. The term "event stream" most commonly refers to a set of events that are generated and occur serially or in a sequence, but the term may also be applied to a set of events that occur in parallel. The events in an event stream may be related in one or more ways. For example, an event stream may include events of the same type, whether or not they come from the same source or are generated in response to the same trigger. Alternatively, an event stream may include events that come from the same source or are generated in response to the same trigger, whether or not they are all the same type. An event stream may be simply be the set of all events received by a clearinghouse, or it may be a subset of these events. Alternatively, event streams may mean a single event in a degenerate case.

Where the event stream is a set of events that occur in a sequence over time, such as where a trigger causes event A to be generated, and event A causes event B to be generated, for example, event A is referred to as being "upstream" from event B, and event B is referred to as being "downstream" from event A. Detection of a trigger condition or conditions may give rise to generation of an individual event or an event stream. As used herein, the term "communications event" refers to an event communicated via a communications network, such as a data network or a telecommunications network.

Examples of triggers include, but are not limited to, visual triggers, near field communications (NFC) triggers, radio communications triggers, audio or aural triggers, proximity triggers, presence triggers, and touch or contact triggers. Visual triggers can be simple, such as detection of a bar code or QR code, or can be complex, such as requiring the recognition of a particular object such as person recognition (through facial recognition, retina scans, or other means), character recognition for license plates, signs and publications, flora and fauna recognition, or other forms of sophisticated visual analysis used to identify items. NFC and radio communications triggers include, but are not limited to, unilateral transmission of data, e.g., "beacons", bidirectional communications and transactions between active devices, and also the signals generated by passive devices in response to an interrogating device. These devices may participate in applications that are collectively known as the "internet of things", or "IoT".

Events of various communications protocols are received by a clearinghouse, which determines an action to take in response to the event or events and determines the target(s) of such action. An action taken by the clearinghouse may itself be an event that causes additional actions to be taken.

According to one aspect, the subject matter described herein includes a method for dynamic execution of actions in response to communications events of one or more communications protocols that are generated in response to a variety of triggers, independent of communications protocol. The method includes, at an event clearinghouse for receiving communications events, receiving a communications event that is associated with a trigger, the communications event having a first communication protocol, identifying an action to take in response to the communications event, identifying a target for the action, and initiating the identified action by or on behalf of the identified target. The event clearinghouse can support one or more communications protocols simultaneously.

According to another aspect, the subject matter described herein includes a system for dynamic execution of actions in response to communications events of one or more communications protocols that are generated in response to a variety of triggers, independent of communications protocol. The system includes an events clearinghouse for receiving communications events, where the events clearinghouse is configured for receiving a communications event that is associated with a trigger, the communications event having a first communication protocol, identifying an action to take in response to the communications event, identifying a target for the action, and initiating the identified action by or on behalf of the identified target, where the event clearinghouse supports a plurality of communications protocols. The clearinghouse may also take action in response to detection of a particular stream of events. Likewise, the clearinghouse may take action in response to an absence of a particular event within in a particular time period or an absence of a particular event that was expected to be received at a certain point in a sequence.

The subject matter described herein for dynamic execution of events in response to communications triggers may be implemented in hardware, software, firmware, or any combination thereof. As such, the terms "function" or "module" as used herein refer to hardware, software, and/or firmware for implementing the feature being described.

In one exemplary implementation, the subject matter described herein may be implemented using a computer readable medium having stored thereon executable instructions that when executed by the processor of a computer control the computer to perform steps. Exemplary computer readable media suitable for implementing the subject matter described herein include disk memory devices, chip memory devices, programmable logic devices, application specific integrated circuits, and other non-transitory storage media. In one implementation, the computer readable medium may include a memory accessible by a processor of a computer or other like device. The memory may include instructions executable by the processor for implementing any of the methods for dynamic execution of events in response to communications triggers described herein. In addition, a computer readable medium that implements the subject matter described herein may be located on a single device or computing platform or may be distributed across multiple physical devices and/or computing platforms.

BRIEF DESCRIPTION OF THE DRAWINGS

Embodiments of the subject matter described herein will now be explained with reference to the accompanying drawings, wherein the like reference numerals represent like parts, of which.

DETAILED DESCRIPTION

Figure 1:
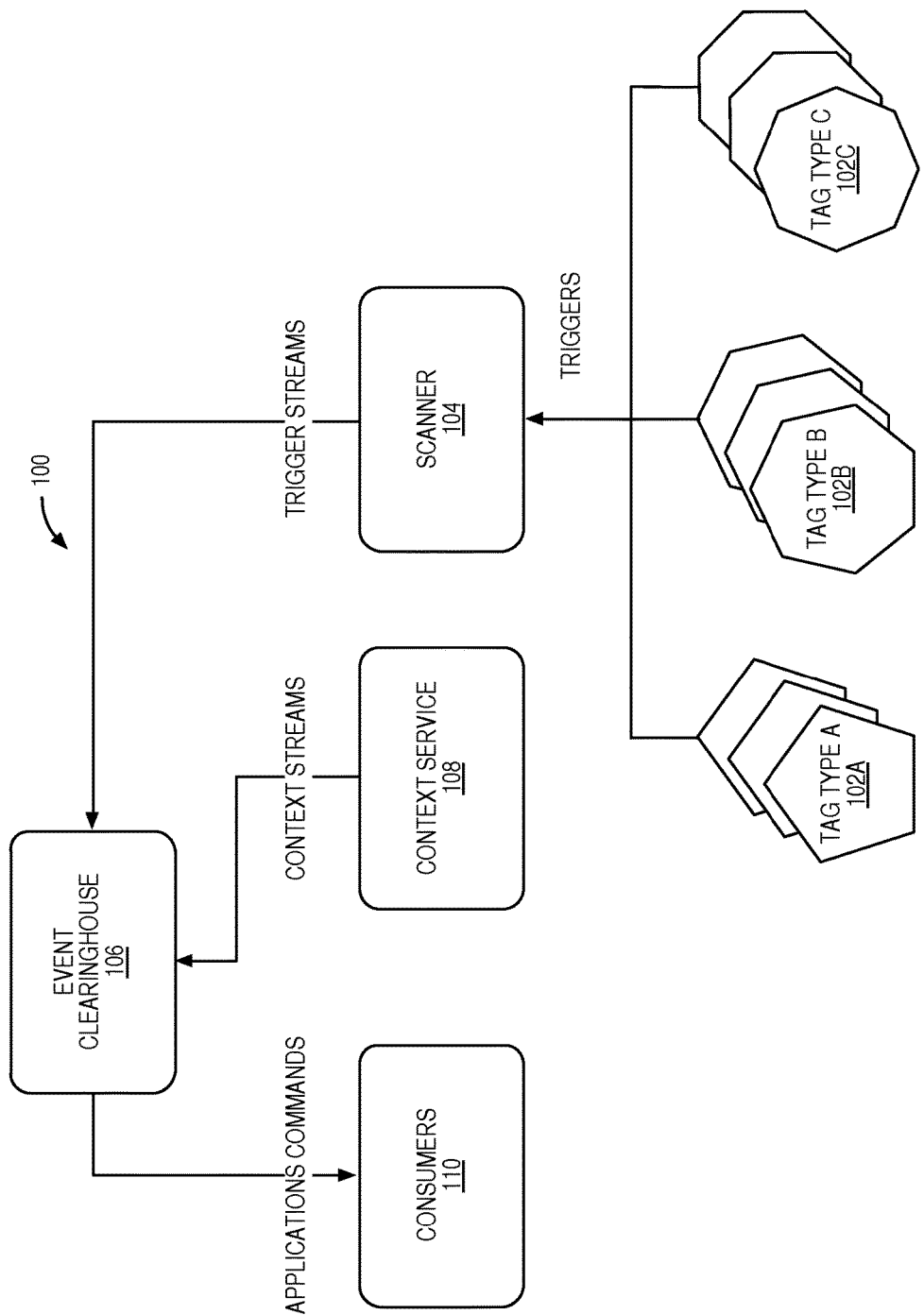
FIG. 1 is a block diagram illustrating an exemplary system architecture for dynamic execution of actions in response to communications events that are generated in response to a variety of triggers, independent of communications protocol, according to an embodiment of the subject matter described herein.

Methods and systems for dynamic execution of actions in response to communications events that are generated in response to a variety of triggers, independent of communications protocol, are presented herein.

Generally speaking, the methods and systems described herein involve a central event clearinghouse that receives events that are generated in response to a variety of triggers and from a variety of sources, including various types of sources, and takes action in response to the events. Example triggers include, but are not limited to, visual triggers, near field communications triggers, and radio frequency triggers. Other types of triggers include, but are not limited to, touch or contact triggers, proximity or presence triggers, audio or aural triggers, motion or acceleration triggers, and user input triggers. Example actions that may be taken by the clearinghouse include, but are not limited to, routing the event to one or more target destinations, and/or initiating some action other than routing the event to a destination. The action taken may be directed towards, or be taken on behalf of, one or more target recipients.

In one embodiment, the event clearinghouse receives an event and determines a matching profile using a profile manager associated with the clearinghouse. The event clearinghouse may determine a set of matching rules to be applied, and then use those matching rules to identify one or more targets and to identify one or more actions to be performed by or on behalf of the identified target(s). Example actions include, but are not limited to, invoking an application on a target smartphone for displaying an advertisement or digital coupon in the form of a QR code; downloading a maintenance routine to a machine on a factory floor; and notifying a smartphone user of the proximity of other people having shared interests. Instructions for performing the determined action can be either explicit or implicit, depending on the capabilities and configuration of the target device.

The event clearinghouse may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine. The event clearinghouse may operate as a standalone device or may be connected (e.g., networked) to other machines. In a networked deployment, the machine may operate in the capacity of a server or a client machine in a client-server network environment, or as a peer machine in a peer-to-peer (or distributed) network environment. Additional details regarding the components, structure, and functions of the event clearinghouse are provided below.

Overview

The subject matter described herein includes methods and systems for dynamic execution of actions in response to communications events that are generated in response to a variety of triggers, independent of communications protocol, are presented herein. By connecting the increasingly pervasive world of proximity-based embedded devices with consumer applications in a wide variety of use cases, the present disclosure provides enhanced value to consumers, retailers, manufacturers, and advertisers.

As used herein, the term "producer" refers to an entity that generates a trigger or trigger condition, and the terms "scanner" and "detector" refer to an entity that detects the trigger or trigger condition and generates an event that is sent to the clearinghouse. A "consumer" may be an entity that is a final destination to which the clearinghouse may route an event or event stream. Alternatively, consumer may be an intermediate party and further downstream transmission or events may occur. The clearinghouse may also be a consumer. For example, when an event is received by a clearinghouse, it may forward the event to one or more destinations, generate an action instead of forwarding the event, or forward the event and also generate an action. What the clearinghouse does in response to an event may depend on the type of event, the rule applied to the event, the destinations determined for the event, other conditions, or some combination of the above.

A producer and detector may be separate entities, as in the case of a Bluetooth beacon (producer) and Bluetooth-capable smart phone (detector), or they may be part of the same entity, as in the case of a motion detector or other physical sensor which generates a signal (e.g., IR or laser light) which it uses to detect movement.

Where the trigger condition is, for example, identification of an image of a person via facial recognition software that is processing a camera feed, it could be said that, conceptually, there is no "producer"—since the detector (i.e., the camera) detects the trigger condition by itself—or it could be said that the person being detected is the "producer", e.g., by his or her very presence. On the other hand, when a barcode scanner recognizes a valid barcode, the barcode could be considered the producer and the barcode scanner could be considered the detector.

The method begins when one or more producers generate and transmit a communications signal ("trigger"). Producers are portable, embedded, and/or wearable communications devices such as QR code labels/stickers, RFID tags (passive or active) (e.g., E-Z Pass transponder, locks, key cards, passports, dog collars), Bluetooth-enabled devices (e.g., headset, watch, speaker, mobile phone, business card), or NFC-enabled devices (e.g., amusement park bracelet, metro card, rewards/loyalty card).

Triggers are broadcast transmissions using any of several communication formats ranging from visible light to various frequencies of radio waves (e.g. Wi-Fi, Bluetooth, NFC, QR code). Each trigger may contain information to identify the type of producer and to identify the source of the producer. Producer source identification may be defined by the producer originating the trigger. Optionally, a producer type identifier may also be maintained for producer classification. In one example use case, a person may be visually recognized using facial pattern recognition and/or other biometric markers such as iris scanning, gait analysis, etc. The visual data may be received the event clearinghouse as trigger input(s).

Another type of producer is a context producer. Context producers provide updates regarding subscribers or environmental conditions that are leveraged by the clearinghouse to execute rules. Contextual information can include, but is not limited to, social updates, GPS or other location information, weather and traffic information, manufacturer information, and product data.

Triggers are received by a scanner, and optionally a context service, which are the initial receivers of triggers and which are responsible for forwarding events to the clearinghouse for further processing. In some configurations scanners can have additional capabilities to pre-filter events prior to delivery to the clearinghouse, or locally deliver triggers to consuming applications prior to or instead of forwarding them for future delivery. Scanners and other receivers may collect multiple triggers together from multiple producers to create one or more event streams. A scanner (or context service) may take any number of forms including, but not limited to, an application on a mobile phone or wearable device, dedicated kiosks, and consumer electronics. Scanners may also be referred to as "readers", "detectors", "receivers", and the like.

Context producers may produce context triggers that are detected by scanners, which generate context events in response, but context producers may also produce context events directly, in which case the context producer may be considered a combined producer and scanner.

The one or more event streams are then received by an event clearinghouse. The event clearinghouse is a server or collection of servers (e.g., cloud service) and may be remotely located from the producers and/or the scanners. The event clearinghouse is responsible for receiving events, processing the received events, and performing some action in response to the events. Actions which may be performed by the clearinghouse include, but are not limited to, delivering the events to their next destination (e.g., another clearinghouse), delivering the events to their final destinations (e.g., consumers), and/or, rather than forwarding the received event, taking some other action, such as sending a text message or email to a subscriber, changing a status of the subscriber in a database maintained by the clearinghouse, recalculating an international currency exchange rate, changing a manufacturing target of a factory floor, and so on. The possible actions that could be performed by, or initiated by, the clearinghouse in response to received events are limited only by the imagination and by the limits of available technology.

Some embodiments may use a centralized clearinghouse, while other embodiments may use a distributed clearinghouse, Still other embodiments may use a hierarchy of clearinghouses, e.g., having a central, top-level clearinghouse with sub-clearinghouses in one or more tiers below. In one embodiment, for example, a scanner could include a mini-clearinghouse that receives events that it can choose to route locally or send to the parent clearinghouse The event clearinghouse identifies a set of consumers based on the event streams and matching rules. For example, a Matching Engine in the event clearinghouse applies rules to determine the next destinations based on data in the event stream(s), tag classifications, contextual information about connected consumers, profile information, or other sources of information accessible to the event clearinghouse. These identified destinations may be referred to as subscribers. Subscribers may be endpoints (e.g., consumers) or waypoints for events delivered by the clearinghouse, and responsible for executing actions/commands or for processing data stored in the event streams. For example, a subscriber may be a waypoint for events that will be delivered to one or more consumers. A subscriber that subscribes a consumer on behalf of the consumer but is not actually the recipient of the action may be referred to as a "proxy manager" or "subscriber manager".

Once processing of all rules is completed, the event clearinghouse generates one or more actions for initiating an action by the consumers. This information may be written to a modifiable event store database.

The one or more actions are sent from the event clearinghouse to the identified set of consumers. Actions are executed by consumers based on the options criteria of the consumer application that receives the event. The consumer application is responsible for reading the tag source, tag type, and any other data available in the event stream which is provided as part of the action. The consumer application determines whether further execution (i.e., the action execution) is warranted based on the data read. The actions to be executed by the consumer can be explicitly stated as an application command or may be implicitly stated and entirely defined within the consumer application. If the event is deemed executable by the consumer application, the actions are executed, e.g., by an action dispatcher or other entity or component of the consumer application. Events can include, but are not limited to, invocation of a webpage, invocation of a social media app, SMS message, invocation of an app (either local to the consumer or remote to the consumer), or analytic decision engine execution. Multiple actions can also be executed based on a single trigger. For example, consumer applications may execute the action and/or may forward the action to other consumer applications.

Thus, the subject matter described herein defines a managed environment for receiving triggers, determining the appropriateness of the trigger to a trigger recipient, and the optional execution of an event based on the reception of the trigger event. Aspects of the system architecture, core process flow, and several example use cases will be described in greater detail below.

System Architecture

FIG. 1 is a block diagram illustrating an exemplary system architecture for dynamic execution of actions in response to communications events according to an embodiment of the subject matter described herein. Referring to FIG. 1, the system 100 includes various producers 102 which generate and send triggers to scanner 104. Scanner 104 sends trigger event streams to event clearinghouse 106. Optionally, context service 108 may also send context event streams to event clearinghouse 106. Trigger event streams and context event streams may be referred to individually or collectively as "event streams". Event clearinghouse 106 may then generate and send actions or application commands to one or more consumers 110. Each of these components will now be described in greater detail below.

Producers 102 include any device capable of transmitting (e.g., broadcasting) a communications signal or otherwise conveying information (e.g., displaying QR codes or barcodes to be scanned). Producers 102 typically transmit signals or otherwise convey information over relatively short distances (e.g., 0-10 meters). Producers 102 are portable, embedded, and/or wearable communications devices and may utilize various communications protocols such as visible light (e.g., QR codes), RFID, Bluetooth, or NFC. Examples of producers 102 include E-Z Pass transponders, locks, key cards, passports, dog collars, headsets, watches, speakers, mobile phones, business cards, amusement park bracelets, metro cards, rewards/loyalty cards, QR codes, and visual biometric indications, including, but not limited to, facial recognition and retina scan. Thus, producers 102 may include type A tags 102A, type B tags 102B, type C tags 102C.

Scanner 104 is responsible for sensing the environment and delivering trigger streams to event clearinghouse 106. Scanner 104 can take any number of form factors including software/hardware running on a mobile phone, a dedicated device, a wall mounted reader, a kiosk, etc. The form factor of scanner 104 may depend on the use case. The scanner 104 may include one or more sensors that implement a communications protocol in common with producers 102 to read nearby producer devices 102.

When a tag 102 is placed in proximity to scanner 104, or when scanner 104 is otherwise a recipient of a tag 102, scanner 104 will forward events matching predetermined criteria to event clearinghouse 106 as one or more trigger event streams. The criteria applied by scanner 104 may depend upon the application and may be configurable by the user. The criteria may also use the trigger type associated with the trigger(s) to define event handling, but is not required to do so.

Alongside scanners 104, context services 108 are the other main contributors to the state maintained by the event clearinghouse 106. Context services 108 may act as one of the producers to the clearinghouse 106. Context services 108 create one or more context event streams that combine information about encountered tags with additional contextual information about the users of the service. Context information can include GPS location, social updates, demographic information, employment history, promotions that are active for a period of time, and other sources of information. Context services 108 have myriad forms and can be specific to a user, application, organization, etc. The context information added by the context service 108 can modify the state of the event clearinghouse 106 and thus may affect rules processing. In one embodiment, a scanner may also act as a context service and provide context information to the clearinghouse.

Event clearinghouse 106 is the central component of system 100 responsible for the interpretation of activities in the form of trigger events and context events into the appropriate actions delivered to consumer applications. Thus, event clearinghouse 106 is responsible for accepting event streams (e.g., context streams and trigger streams) from producers 104 and 108, creating a target consumer set by matching the event information, context information, rules, and consumers 110. Event clearinghouse 106 then performs one or more actions, which may entail delivering messages to interested consumer applications 110. These messages may themselves be actions or instructions for actions (e.g., application commands).

There is no requirement that event clearinghouse 106 is a single node. Some use cases may use one or more clearinghouse components 106. It is also possible that the clearinghouse 106 may include a network of interconnected clearinghouses 106 that collaborate to accomplish the use cases. The event clearinghouse 106, however, is referred to hereafter as a single entity for simplicity.

The event clearinghouse 106 may include a service that makes its capabilities available through APIs. The APIs can leverage any communication/protocol technology including but not limited to web services, RESTful web services, asynchronous messaging, event streaming services, raw tcp/ip, Bluetooth®, NFC, ad-hoc mesh networking, etc. The specific protocols and networking technologies may depend on the use cases and environment in which the event clearinghouse 106 is deployed.

The event clearinghouse 106 is also responsible for the management of a representation of the current state of the environment. This state is interpreted from the events that event clearinghouse 106 has received as event streams over time and the contextual information that is provided by context service 108. This state representation can be stored by event clearinghouse 106 in memory, persisted, or partitioned across a network of machines' memory or disks. The details of implementation may vary depending on the quantity of information necessary to represent the state and the speed at which that information needs to be processed.

The event clearinghouse 106 is also responsible for the application of rules on the state representation in order to determine which actions to dispatch to consumer applications 110 or other clearinghouses for further processing. The rules can take a variety of forms including but not limited to compiled code, RETE engines, event stream processing frameworks, and interpreted scripts. The rule engine may access the state information managed by the event clearinghouse 106 through API, direct memory access, or a variety of other techniques. Rules execute on a frequency defined by the use case and governed by the engine. Rules can execute upon every state change (trigger arrival, context updates, etc.), at a predefined time, every n seconds, etc. Rules may also include machine learning algorithms such as grouping by learning or grouping by similarity.

The rules executed by the event clearinghouse 106 interpret the state at the time of execution (or a window of time) and determine the actions to be executed by the consuming applications 110. The event clearinghouse 106 is then responsible for delivery of these actions to the targeted consumers 110. This delivery can either be pulled from the consumer client 106 or pushed from the event clearinghouse 106 (or a combination of both techniques) depending on the connectivity capabilities of the interacting devices 106 and 110. They can leverage any of the aforementioned protocols or any other protocol/technology that is appropriate for the use case.

The event clearinghouse 106 may provide facilities to analyze and improve its functioning. These services can take the form of long term event storage for historical analysis, machine learning algorithms to create and enhance rules, replay capabilities to test hypotheses, etc. These capabilities can also be provided by a client or peer of the clearinghouse in some embodiments.

The event clearinghouse 106 may also contain a set of support services that provide capabilities for authentication, user management, device registration and management, metadata management, system management and monitoring, storage, memory management, etc. These support services will be described in greater detail below with respect to FIG. 3.

Consumers 110 are capable of executing actions dispatched by the event clearinghouse 106. Consumers 110 can take any number of form factors including software/hardware running on mobile phones, dedicated devices, wall mounted readers, kiosks, automobiles, devices, the internet of things, etc. The correct form factor of consumers 110 may depend on use case. Consumers 110 receive events from the clearinghouse 106 and can execute some or all of the actions that are requested in those events. Each consumer application 110 may determine which, if any, of the actions requested by the event clearinghouse 106 are to be executed by the consumer 110.

Core Process Flow

Figure 2:
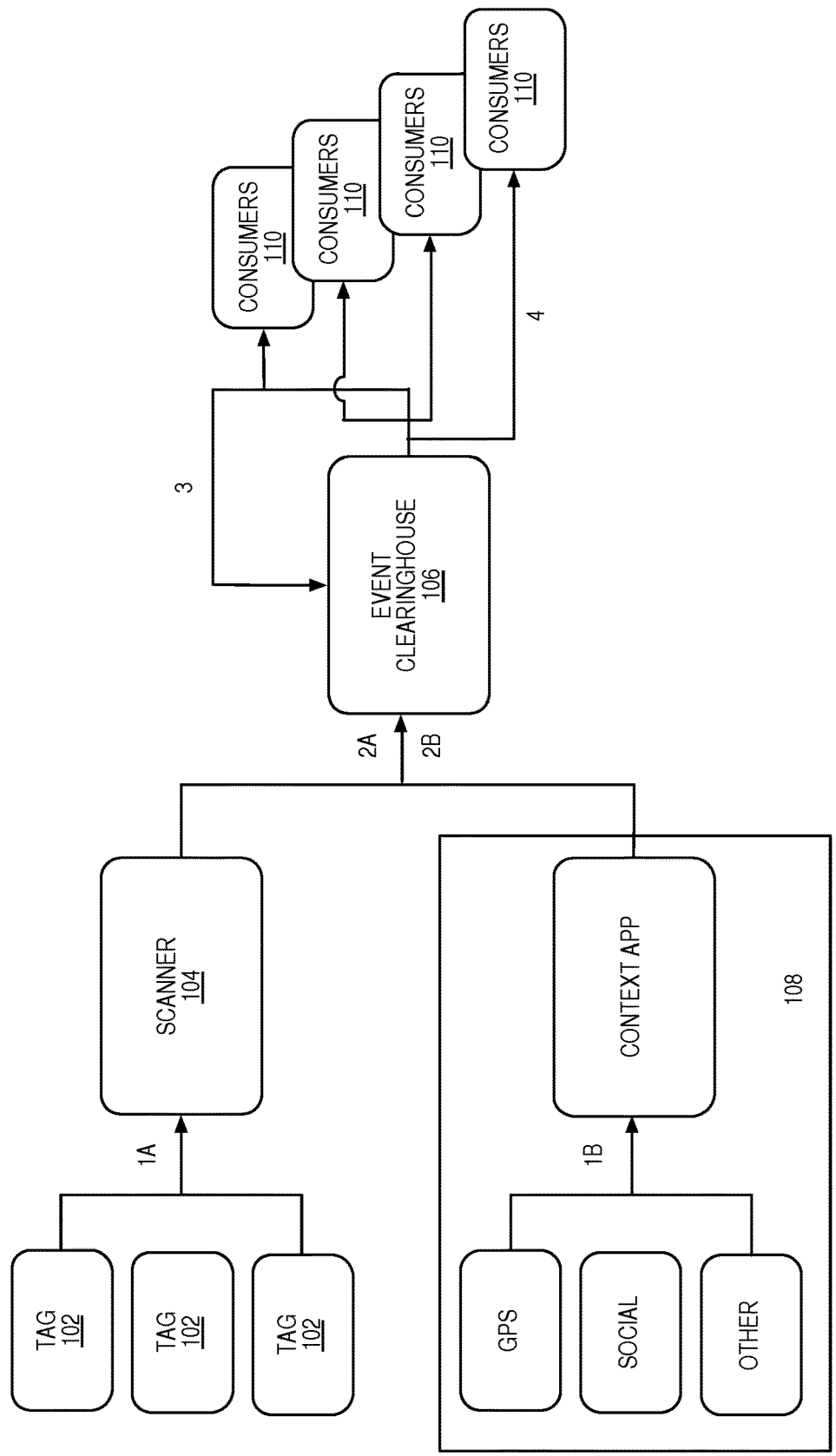
FIG. 2 is a flow chart illustrating an exemplary process for dynamic execution of actions in response to communications events that are generated in response to a variety of triggers, independent of communications protocol, according to an embodiment of the subject matter described herein.

FIG. 2 is a flow chart illustrating an exemplary process for dynamic execution of actions in response to communications events according to an embodiment of the subject matter described herein. Referring to FIG. 2, the process may begin at step 1A when tags 102 send triggers to scanner 104. For example, an RFID-tagged object may be scanned by an RFID-enabled mobile phone. Various information may be included in the trigger such as information identifying the type of tag, a product category, a manufacturer, or a serial number. Similarly, at step 1B, context app 108 may receive context information from various context information producers. Context information may include social networking status updates, GPS location information, or other information not provided by tags 102.

Producers 104 and 108 then aggregate the information obtained in steps 1a and 1b into one or more event streams. At steps 2A and 2B, the respective event streams are provided to an event clearinghouse 106 for processing. The event clearinghouse 106 is typically, but not always, located remotely from producers 104 and 108. As such, the communications protocols used to communicate between producer 104 and tags 102 (e.g., Bluetooth) may be different from the protocols used to communicate between producer 104 and event clearinghouse 106 (e.g., TCP/IP).

At step 3, the event clearinghouse 106 identifies a set of consumers based on the event streams and matching rules. For example, a Matching Engine in the event clearinghouse applies rules to determine the next destinations based on data in the event stream(s), tag classifications, contextual information about connected consumers, profile information, or other sources of information accessible to the event clearinghouse.

Once processing of all rules is completed, the event clearinghouse 106 generates, at step 4, one or more actions for initiating an action by the consumers. The one or more actions are sent from the event clearinghouse to the identified set of consumers 110. Actions are executed by or on behalf of consumers 110 based on the options criteria of the consumer application that receives the event. The consumer application 110 is responsible for reading the data provided by the event clearinghouse 106. The consumer application 110 determines whether further execution (i.e., the action execution) is warranted based on the data read. The actions to be executed by the consumer 110 can be explicitly stated as an application command or may be implicitly stated and entirely defined within the consumer application. If the event is deemed executable by the consumer application 110, the actions are executed. Events can include, but are not limited to, invocation of a webpage, invocation of a social media app, SMS message, invocation of an app (either local to the consumer or remote to the consumer), or analytic decision engine execution. Multiple actions can also be executed based on a single trigger.

Event Clearinghouse—Detailed

Figure 3:
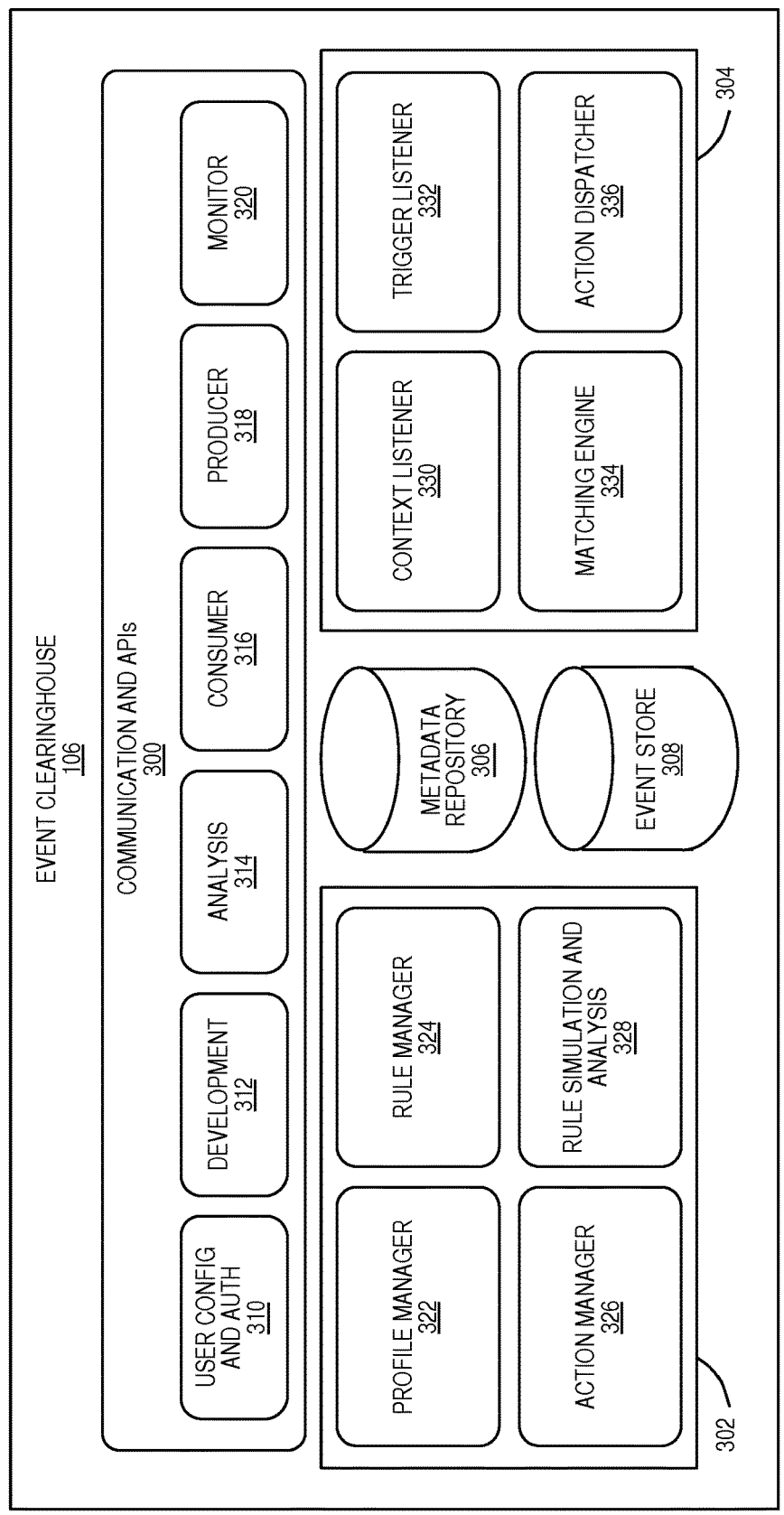
FIG. 3 is a block diagram illustrating an exemplary event clearinghouse for dynamic execution of actions in response to communications events that are generated in response to a variety of triggers, independent of communications protocol, according to an embodiment of the subject matter described herein.

FIG. 3 shows a diagrammatic representation of a machine in the example form of a computer system within which a set of instructions, for causing the machine to perform any one or more of the methodologies discussed herein, may be executed. Referring to FIG. 3, event clearinghouse 106 may include communications services and APIs 300, metadata subsystem 302, delivery subsystem 304, and databases 306-308.

Communications services and APIs 300 may be responsible for communication between event clearinghouse 106 and other external components, such as producers 104 and 108, consumers 110, and other clearinghouses 106. External devices may also include computer access terminals so that users or administrators may configure, authenticate, develop, or monitor aspects of event clearinghouse 106. Communications services and APIs 300 may also be responsible for communication between event clearinghouse 106 and other internal components, such as metadata subsystem 302, delivery subsystem 304, and databases 306-308. Communications services and APIs 300 may include a user configuration and authentication module 310, a development module 312, an analysis module 314, a consumer module 316, a producer module 318, and a monitor module 320.

A user configuration and authentication module is an API that allows users to login to the system and to validate that they have the permissions to execute the activities that they are attempting. It is optional in most configurations, though it may be a required component for secured networks The development module is an API that allows rule developers to manage the lifecycle of the artifacts they create. Capabilities could include version control, versioned activation, test execution, build, and other services associated with the development of code and metadata artifacts The analysis module is an API that allows rule writers to understand and measure the performance of event rule execution. Results from analysis are often used to develop the next version of the rules using information discovered through this API to improve upon existing artifacts The consumer and producer modules are APIs designed to allow the delivery of messages to and from the clearinghouse. Producer submit new events and streams using the producer API. Actions are delivered to consumers through the consumer API The monitor module is used to maintain and control the health of the clearinghouse system. It may make system metrics, logs, backup and restore actions, and many others available for administrators to take advantage of.

The metadata subsystem 302 allows users to configure the behavior of the clearinghouse 106, develop and manage the lifecycle of rules used at runtime, and to provide details about subscribers of the service in the form of consumer profile information. The metadata subsystem 302 includes a profile manager 322, a rule manager 324, an action manager 326, and a rule simulation and analysis module 328.

The delivery subsystem 304 is responsible for combining previously stored metadata, incoming triggers, and frequently changing context information to deliver incoming events to interested consumers. The delivery subsystem 304 includes a context listener 330, a trigger listener 332, a matching engine 334, and an action dispatcher 336.

Metadata repository 306 may store metadata associated with producers or consumers obtained from event streams. Metadata may include both structural metadata about the design and specification of data structures or descriptive about individual instances of application data or the data content.

Event store 308 may store actions or event streams once processing has been performed by event clearinghouse 106 to determine a target set of consumers 110.

In the example of FIG. 3, the event clearinghouse 106 may include computer system 300 which includes a processor, memory, non-volatile memory, and an interface device. Various common components (e.g., cache memory) are omitted for illustrative simplicity. The computer system 300 is intended to illustrate a hardware device on which any of the components depicted in the example Figures (and any other components described in this specification) can be implemented. The computer system 300 can be of any applicable known or convenient type. The components of the computer system 300 can be coupled together via a bus or through some other known or convenient device. The processor includes hardware and may be a conventional microprocessor such as are made by Intel, AMD, ARM, and other manufacturers. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed. The bus couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus may couple the processor to a network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, computer system 300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Use Cases

Social

Figure 4:
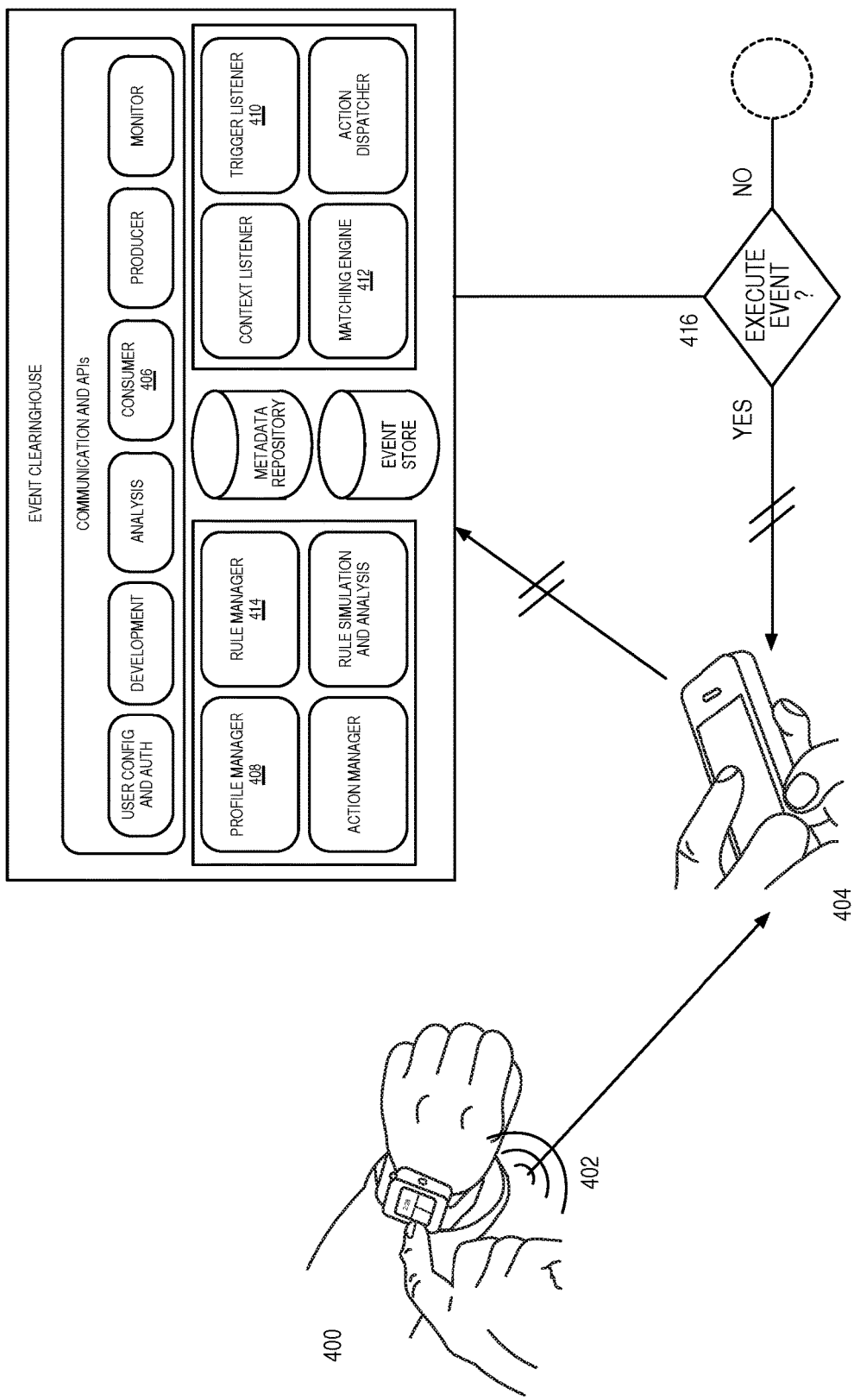
FIG. 4 is a diagram illustrating a social use case according to an embodiment of the subject matter described herein.

FIG. 4 is a diagram illustrating a social use case according to an embodiment of the subject matter described herein. This embodiment concerns the use of event clearinghouse 106 for identification of, and sharing of, information about consumers that have expressed common interests. At step 402, the producer 102 may be a device 400 that generates a near field communications signal (e.g., the trigger) such as a mobile phone, piece of jewelry, smart watch, or others device with an RFID chip. The trigger signal transmitted by producer 102 contains an identification and a signal class, such as a "social" class, and a ProducerID.) The ProducerID identifies the producer 102, such as a model number of a smartwatch. The producer 102 may have a registration profile in the clearinghouse profile manager.

At step 404, an application on the scanner 104 receives the signal. For example, a mobile device receives an RFID signal from the user's smartwatch. In an alternate embodiment, the signal may be a code visible on the producer (e.g. a tattoo) or an NFC-capable chip (e.g. RFID) embedded into the body of the consumer.

The user receiving the signal at step 404 may be registered as someone wishing to receive social signals. Registration may be performed via a consumer app at step 406 and the registration may be stored in the profile manager at step 408. (Registration is discussed in more detail below, in the description of FIG. 10.) For example, a user may wish to be notified when other users who are also interested in a particular baseball team are near each other. At step 410, the signal may be routed from the scanner 104 (e.g., mobile phone) to the event clearinghouse trigger listener.

Event clearinghouse 106 identifies the "areas of influence" of the producer 102 associated with the ProducerID. The event clearinghouse 106 also identifies the list of consumer applications 110 that are "interested" in this type of event using the matching engine 334 and rules manager 324. For example, a target set of consumers may be determined based on a set of matching rules (step 412) executing against the rules stored in the rules manager (step 414). The targeted consumer set can include both subscribers whose originating scanner triggered the event and subscribers that are not associated with the originating scanner that triggered the event.

The event and signal information may then be sent to all active consumer applications (not shown). Upon receiving the action information from the event clearinghouse 106, each consumer 110 decides whether to execute the event (step 416). Examples of events that may be executed include displaying a Facebook page, display a website of interest, or invoke an application.

Retail—Manufacturing

Figure 5:
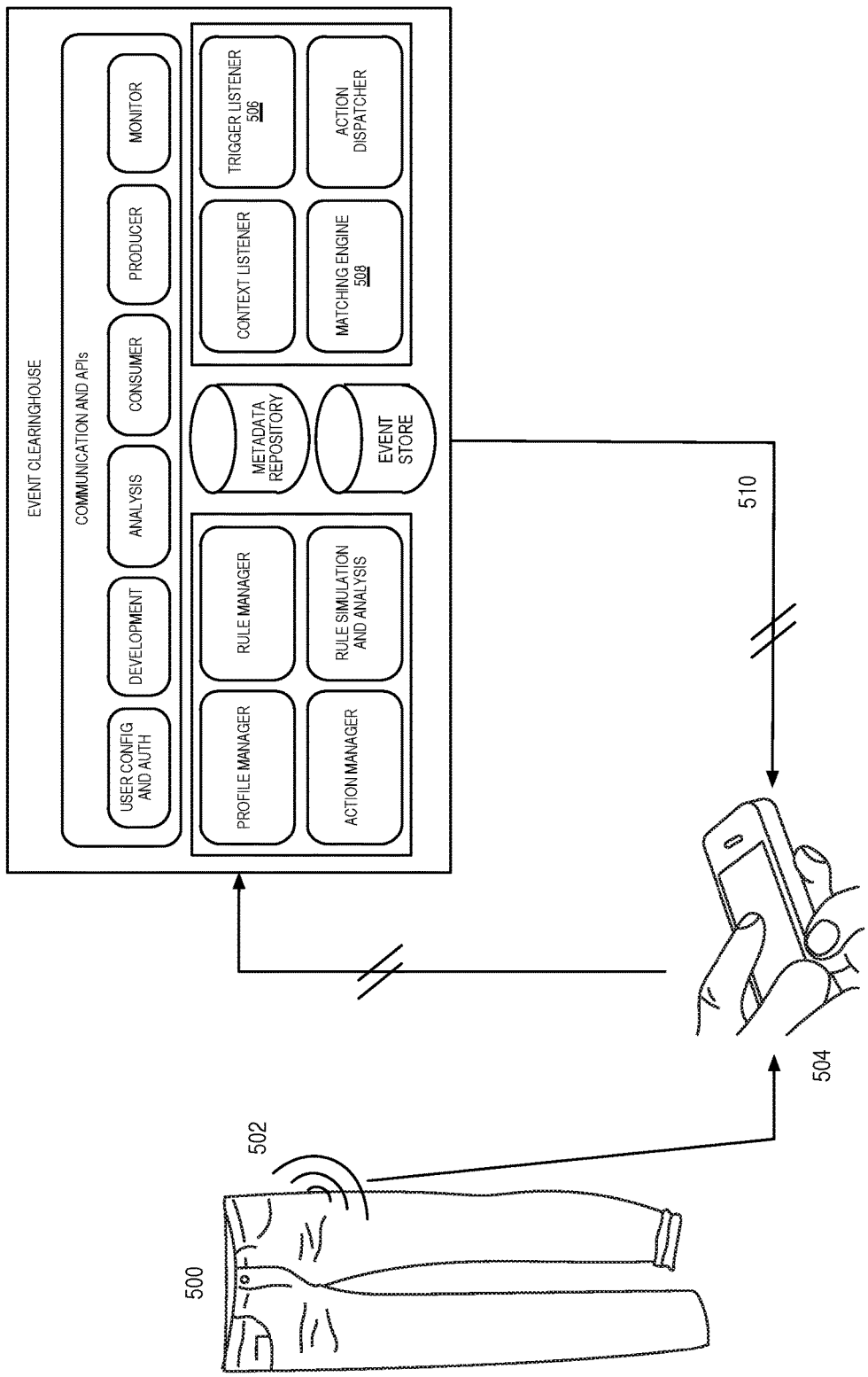
FIG. 5 is a diagram illustrating a retail manufacturing use case according to an embodiment of the subject matter described herein.

FIG. 5 is a diagram illustrating a retail manufacturing use case according to an embodiment of the subject matter described herein. Referring to FIG. 5, the producer 102 is any manufactured product (for example, toy, clothing, food packaging, vehicle, etc.) which initiate a trigger signal. For example, at step 500, the signal is produced by a pair of jeans with an embedded near field communication signaling device, such as an RFID chip. At step 502, the RFID chip embedded in the clothing generates a trigger signal that identifies the signal and a signal class. For example, the signal may include a "retail" class, a "jeans" productcategoryID; a "Levis" manufacturerID; and a "501" productID. The consumer list can include subscribers that are not the originating scanner that triggered the event. The Clearinghouse delivers the processed events to all consumers as a mobile application that displays information about the product.

In an alternative embodiment, the article of clothing continuously broadcasts the signal (retail; clothing; manufacturerID; productID.) At step 504, the consumer has an application that receives the signal (e.g., mobile phone) and the consumer has registered as someone that will send and receive these signals. At step 506, the consumer device generates an event, which may or may not include information within or encoded by the signal, and sends the generated event to the event clearinghouse trigger listener with identification information. At step 508, the event clearinghouse identifies the list of consumer applications that are "interested" in this type of event (retail; clothing; manufacturerID; productID) based on a set of matching rules. The product identification produces the execution of an activity based on the trigger identification and the profile of the consumer (receiver.) At step 510, the clearinghouse notifies the consumer about the article of clothing (style, color, nearest retail outlet, etc.)

In an extended embodiment, the event clearinghouse 106 recognizes the consumer from past engagements based on information from the profile manager, event store and/or context information. For example, the consumer is recognized as a frequent buyer or premium customer for the manufacturer based on profile information in the Clearinghouse profile manager. In this alternate embodiment, the rules engine recognizes the premium customer and executes an alternate activity (e.g., delivery of an SMS message with a discount on the product that is identified.) Alternatively, the consumer could be identified as someone that has payments past due. In this event, the clearinghouse initiates a different activity by way of the action dispatcher that sends a notice to the consumer of outstanding bills.

In an extended embodiment, the system can be used for marketing and advertising in the same manner as Pay Per Click is executed for world wide web traffic. The trigger can be considered analogous to a click. Manufacturers and retail outlets can bid for delivery of an action execution based on the "click"/trigger. Based on the trigger and the consumers' profile, as well as the advertisers' profile, the most appropriate action is triggered. Manufacturers and retailers would pay for delivered actions.

Retail—Product Support

Figure 6:
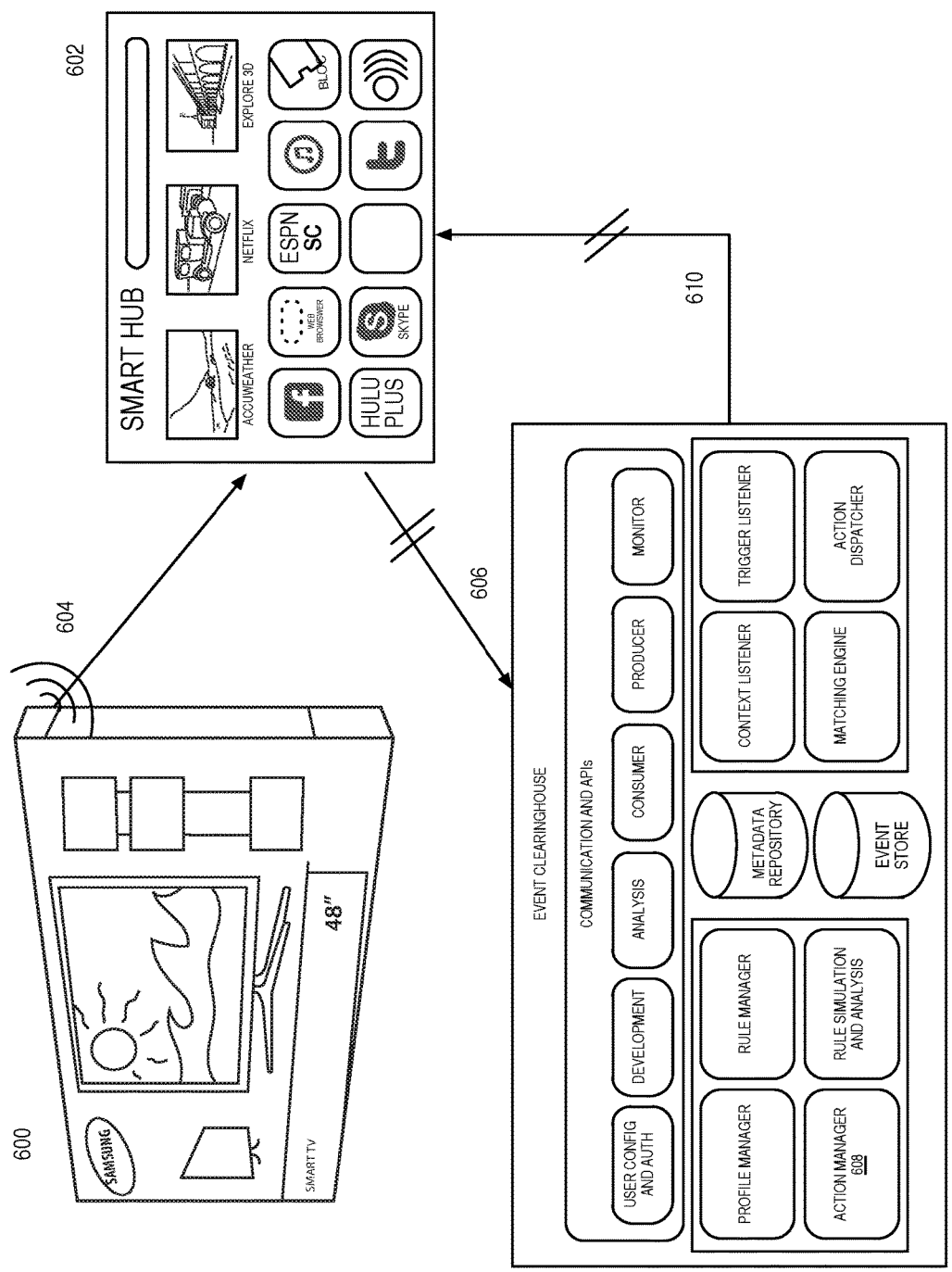
FIG. 6 is a diagram illustrating a retail product support use case according to an embodiment of the subject matter described herein.

FIG. 6 is a diagram illustrating a retail product support use case according to an embodiment of the subject matter described herein. In a further embodiment of the primary application, a manufacturer uses NFC to enhance the initial experience with a new customer with product on-boarding. The clearinghouse will manage the new customer experience based on the product and the needs of the new customer, including, but not limited to, warranty registration, access to users manuals or frequently asked questions, and system upgrades to the device. For example, an electronics manufacturer decides that the expense and the carbon footprint of printed manuals are not in the best interest of the company or the consumer. The producer here is an electronics manufacturer of smart TVs. In order to reduce costs, the manufacturer has decided not to include printed instructional information. Instead the manufacturer includes an RFID chip 600 and a QR code that has identification information and a signal class (in this case instructional.) The consumer in this case is a smart TV 602. After initial setup, the consumer needs further information. In order to receive further information, the consumer can scan the QR code with a QR reading device (e.g. mobile phone) or can receive the RFID signal 604 with a receiving device (in this case, the smart TV.) Either the QR code or the RFID chip contains identification information and signal class (instructional; manufacturerID; componentID) In this example, componentID is the name and serial number of smart TV. At step 606, the trigger event is sent to the event clearinghouse and, at step 608, the action manager returns an action—in this case to launch a manual reader application with the appropriate documentation. The consumer has elected to receive these notifications and, at step 610, the instructional information is displayed on the smart TV via a book reader app. In a further example, once the TV is installed, the trigger signal is received from the packaging by the smart TV. The profile manager recognizes that this particular TV has never initiated a trigger in the past. Based on rules in the rules manager, the clearinghouse initiates a "first connection action" and presents that consumer with the opportunity to submit a warranty card, take a virtual tour of the TV or view the manual.

Dating and Networking

Figure 7:
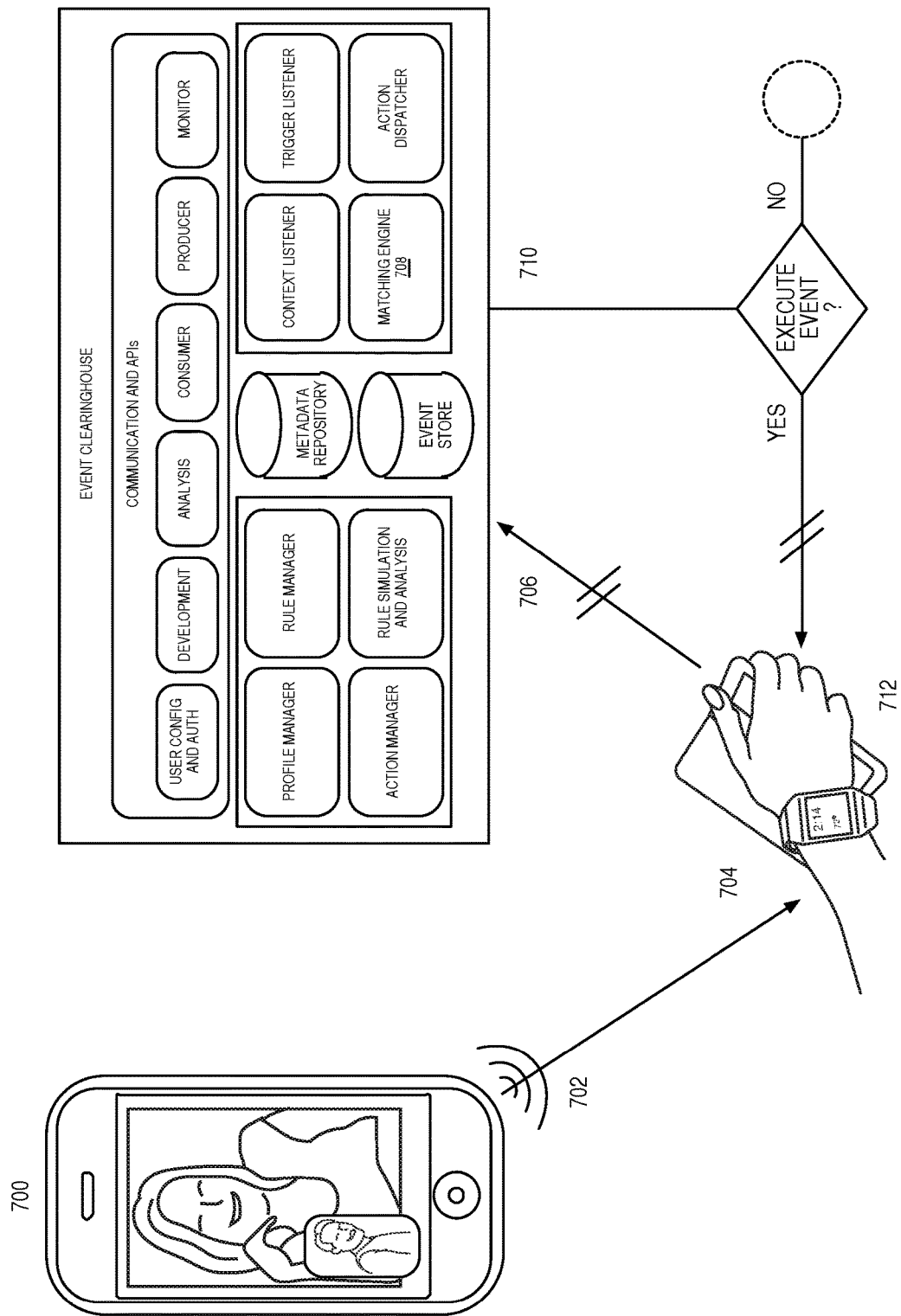
FIG. 7 is a diagram illustrating a dating use case according to an embodiment of the subject matter described herein.

FIG. 7 is a diagram illustrating a dating use case according to an embodiment of the subject matter described herein. In another embodiment, the clearinghouse can provide for a variety of social networking applications for dating services, social networking or community networking. Based on a token (e.g., heart pendant, business card, booth giveaway, corkscrew, mobile device etc.), people can become part of groups that share common interests. The goal of these affinity groups is to facilitate meeting one on one for dating, networking and recruiting community interaction.

By way of example, this embodiment can support an online dating service. The producer is a member of an online dating community—a community of people with similar interests that are available to meet other members of their community. Via blue tooth communications and a dating app on the producer smart phone 700, a signal 702 is broadcast (trigger.) In addition to the trigger, GPS information is also broadcast. The consumer is a member of the same dating community and has a smart watch that acts as a scanner and captures the trigger and GPS information (step 704). The trigger is tagged as social; dating; communityID. At step 706, a trigger event is sent to the event clearinghouse along with GPS information. The event clearinghouse recognizes the signal and GPS information and, at step 708, routes the signal to the matching engine 334, which identifies consumers interested in the social; dating; communityID signals that also are currently identified by GPS as being in the same geographical area. At step 710, the event clearinghouse routes the action (dating app with context of producer) to the consumer. If the consumer accepts the signal, then at step 712, the app displays additional information to the consumer, e.g., via the consumer's scanner or via other device owned by the consumer. In addition, information indicating the consumer's acceptance of the signal may be sent to the producer.

Manufacturing Assembly

Figure 8:
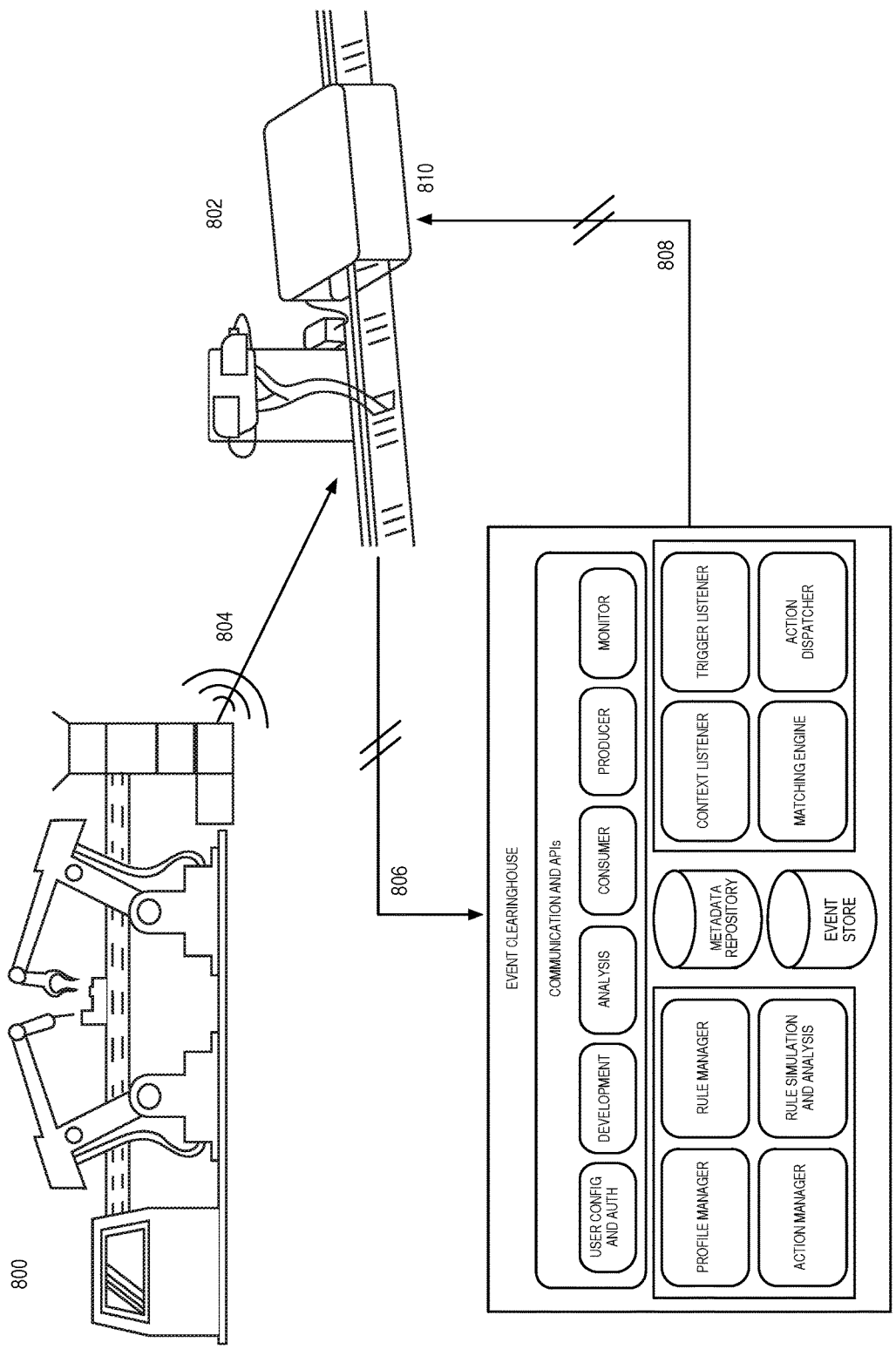
FIG. 8 is a diagram illustrating a manufacturing assembly use case according to an embodiment of the subject matter described herein.

FIG. 8 is a diagram illustrating a manufacturing assembly use case according to an embodiment of the subject matter described herein. On the widget assembly line 800, the maintenance protocol is dependent on the number of widgets manufactured. The producer in this case is the finished product with an RFID embedded chip. The consumer is the assembly line sensor/scanner 802. Each time a finished widget is produced, scanner 802 on the assembly line reads the RFID 804 (the trigger.) A trigger event, along with identification information, is sent to the event clearinghouse (message 806). The event clearinghouse recognizes that an appropriate maintenance application is run based on the number of widgets produced. The appropriate application 808 is sent to the consumer and is executed on the assembly line maintenance module 810.

Gaming and Scavenger Hunt

Figure 9:
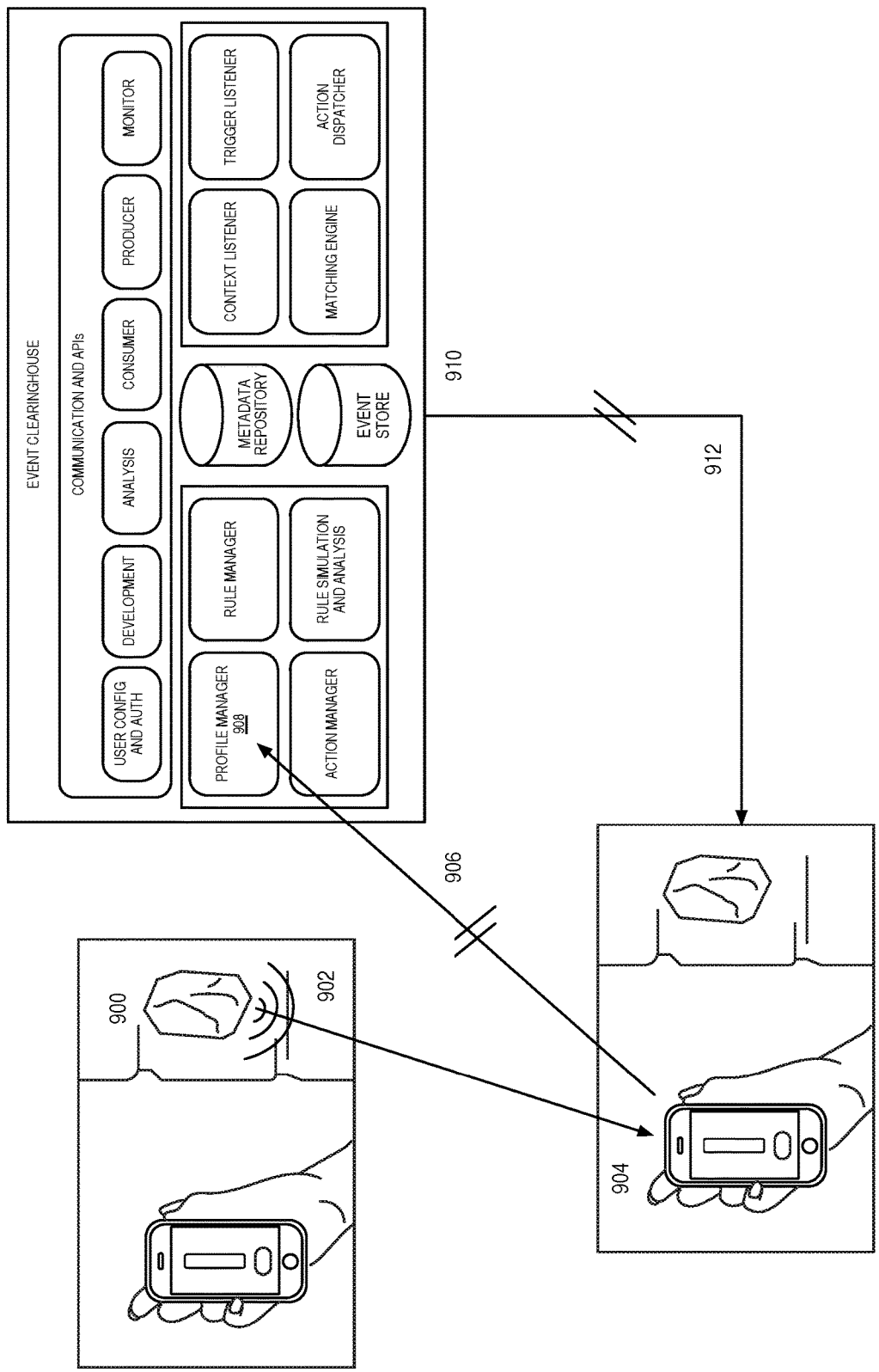
FIG. 9 is a diagram illustrating a gaming food and beverage use case according to an embodiment of the subject matter described herein.

FIG. 9 is a diagram illustrating, by way of example, a gaming food and beverage use case according to an embodiment of the subject matter described herein. The producer(s) in this example gaming case are a number of local food establishments. By way of this example, restaurants and bars may choose to participate in a gaming event (e.g., scavenger hunt) to encourage potential customers. The participating establishments have created a "scavenger hunt." Participation in the scavenger hunt and completion of the scavenger hunt provides discounts and coupons. The consumer is a person that has registered to participate in the scavenger hunt. Each establishment uses a beacon 900, which sends a signal 902 that is specific to the scavenger hunt and the establishment (gaming; scavenger hunt; scavengerhuntID; establishmentID.) The consumer has elected to participate in events with this signal. The consumer captures the signal with the scanner app 904 (in this case via smart phone) and transmits an event to event clearinghouse (message 906). At each point during the scavenger hunt, the progress of the consumer's scavenger hunt is logged in the profile manager (step 908) and the establishment can execute an event specific to the establishment that is routed from the action dispatcher, e.g., an SMS text message, a discount coupon, provide a fee appetizer, etc., (message 910), which the consumer receives (step 912).

Registration

Figure 10:
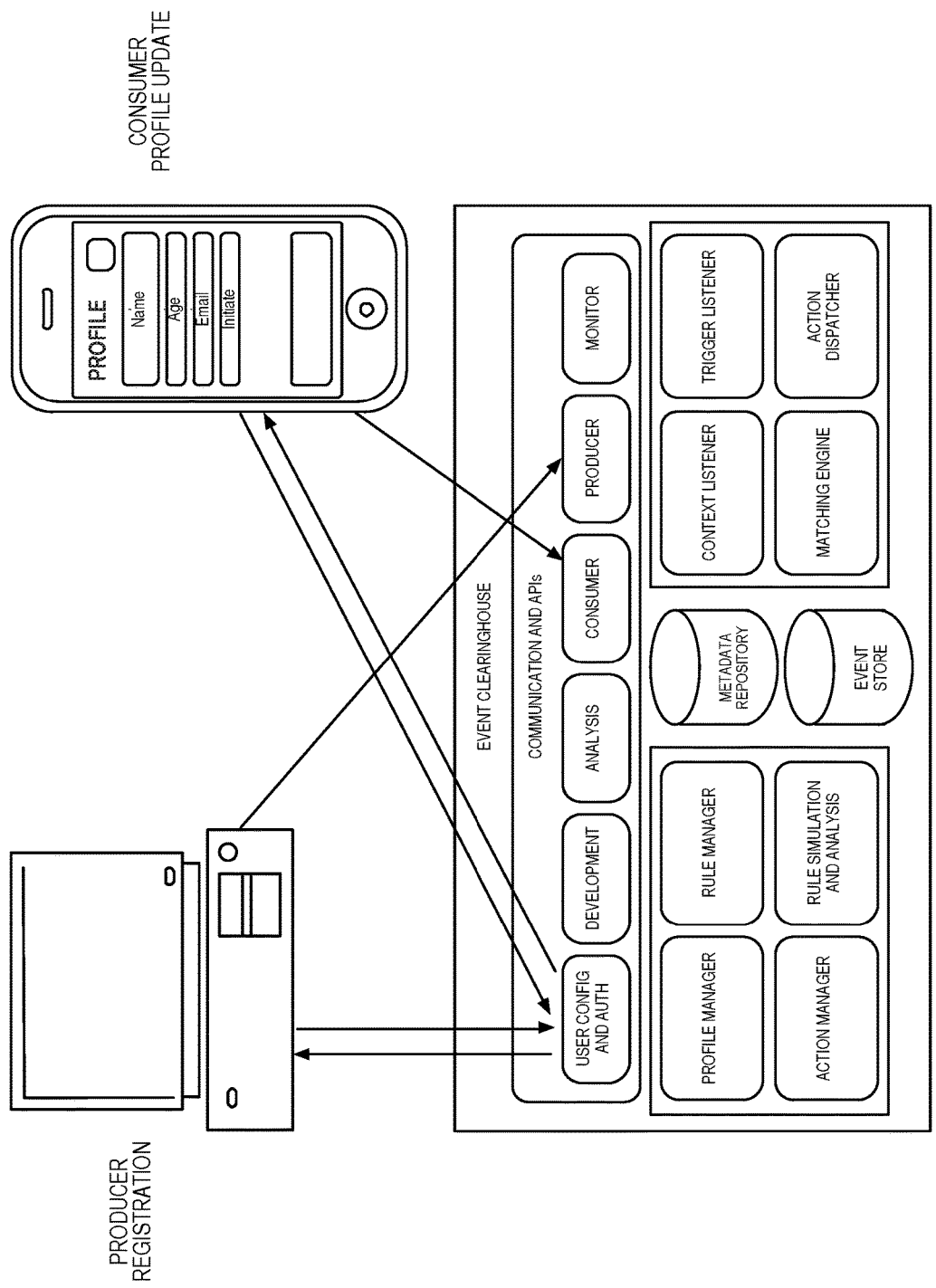
FIG. 10 is a diagram illustrating a registration use case according to an embodiment of the subject matter described herein.

FIG. 10 is a diagram illustrating a registration use case according to an embodiment of the subject matter described herein. This FIG. illustrates how the event clearinghouse communication and APIs may be used by producers, consumers, and subscribers. In one embodiment, a producer may use a web interface to set up producer profiles along with producer configuration and authentication information, such as login names, passwords, account settings, etc. Consumers may likewise use provided APIs to set up consumer profiles and authentication information. Both producers and consumers may establish preferences and interests. Producers may provide information about the kinds of events, triggers, and messages that may be produced, as well as the kinds of actions that may be taken. Providers may also provide parameters by which consumers may be matched to the events received. Those information may be embodied as rules, actions, triggers, etc., may be stored by the event clearinghouse, such as in the metadata repository, and may be used by the various components of the event clearinghouse.

Automotive

Figure 11:
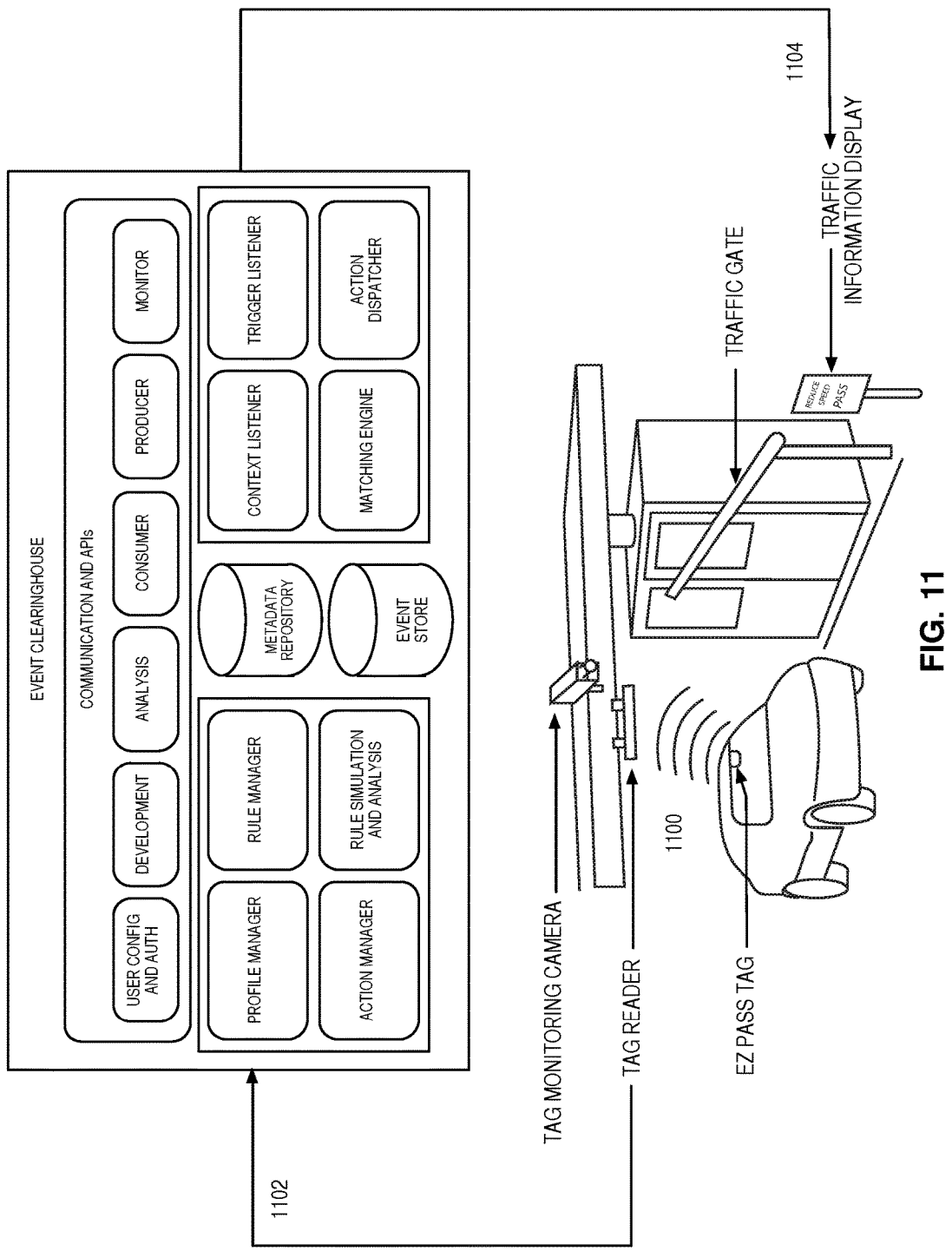
FIG. 11 is a diagram illustrating an automotive use case according to an embodiment of the subject matter described herein.

FIG. 11 is a diagram illustrating an automotive use case according to an embodiment of the subject matter described herein, whereby the event clearinghouse 106 provides appropriate actions based on trigger information and context information. In one example embodiment, the event clearinghouse 106 is used to manage real time traffic information. Transponders in automobiles act as triggers when they pass appropriately configured scanners that are installed at predefined locations along the roadway. For example, at step 1100, the tag located inside the vehicle passes the tag reader, which receives trigger information from the tag. At step 1102, event information is sent to the event clearinghouse. Based on the triggers from all of the cars it is possible to create a real time view of traffic congestion, along all paths that scanners are installed across. Rules for specific drivers can be configured based on their current destination, tolerance for traffic, and any other context items such as their calendar for when their next appointment is. At step 1104, information is sent from the event clearinghouse back to the vehicle or a mobile phone associated with the driver of the vehicle. For example, when a specific automobile is about to enter an area of traffic which would prevent them from reaching their destination in the allotted amount of time, the clearinghouse recognizes this potential situation and sends an action to the car GPS to reroute around the impending traffic jam.

Battlefield

Figure 12:
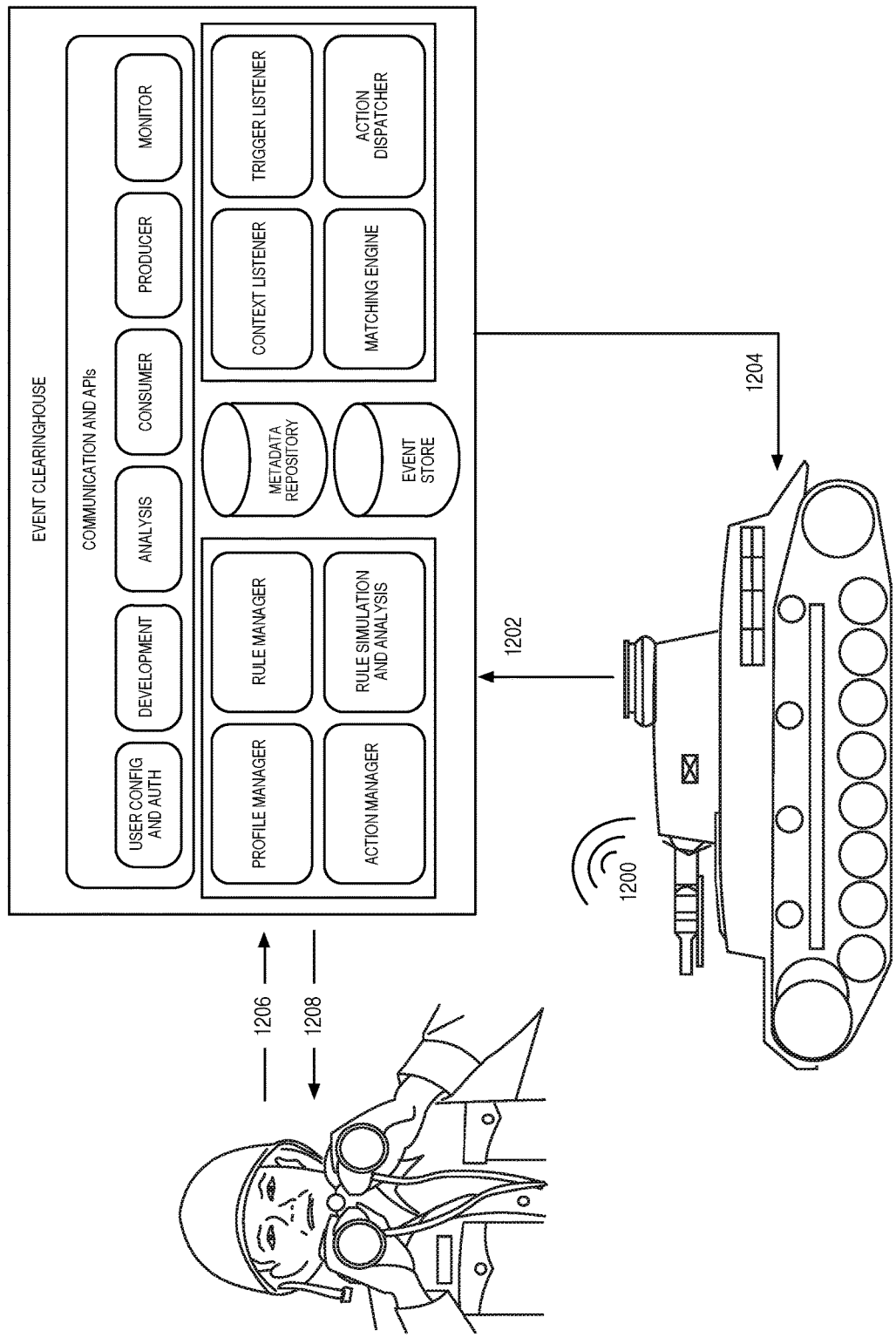
FIG. 12 is a diagram illustrating a battlefield use case according to an embodiment of the subject matter described herein.

FIG. 12 is a diagram illustrating two battlefield use cases according to an embodiment of the subject matter described herein. The battlefield use case provides for action delivered to the battlefield based on triggers and battlefield context information received by the clearinghouse 106. In one embodiment of battlefield actions based on triggers the event clearinghouse 106 is responsible for coordinating the activities of a group of bomb disposal robots that are clearing a mine field. For example, at step 1200, each robot connects to the clearinghouse through an ad-hoc radio network. Triggers in this example are detected underground mines. At step 1202, when a new mine is detected the trigger is forwarded to the clearinghouse. At step 1204, the clearinghouse updates the routes of other robots and any other vehicles that are currently en route to the location.

In another embodiment, soldiers are outfitted with medical devices that monitor biometric readings such as blood pressure, heart rate, o2 concentration, and any other test that the device is capable of running in real time. At step 1206, the medical devices generate trigger event streams to be delivered to the clearinghouse containing the biometric readings. At step 1208, the clearinghouse processes a set of rules and optimizes the deployment of medical personnel in order to best treat battlefield injuries based on the constantly shifting medical scan of every soldier in the environment.

Conferences and Events

Figure 13:
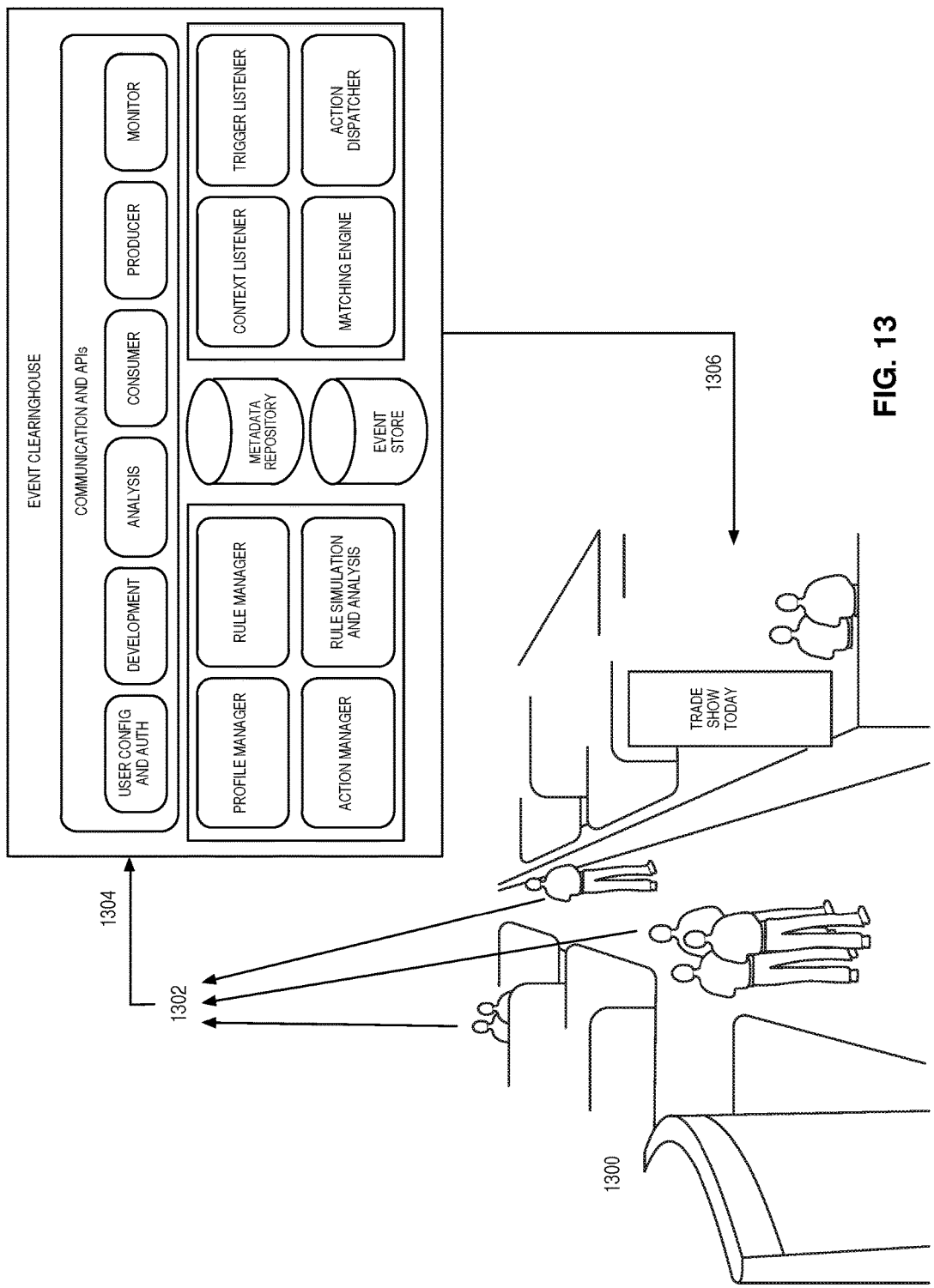
FIG. 13 is a diagram illustrating a conference and event use case according to an embodiment of the subject matter described herein.

FIG. 13 is a diagram illustrating a conference or event use case according to an embodiment of the subject matter described herein. In another embodiment, the clearinghouse can provide for execution of variety of activities between conference organizers and conference attendees, between conference attendees or between conference sponsors and attendees. Based on a token (e.g., conference registration badge or other conference give-away.), attendees can be identified. Attendee information stored in the profile manager identifies areas of interest to the attendee. Attendee location information can, optionally, be provided by the scanners placed throughout the conference venue. The goal of attendee identification embodiment is to provide an enhanced experience to the attendee by providing opportunities to network with people of similar interest, to allow the conference organizers to alert attendees of upcoming events, to allow the sponsors of the conference to provide appropriate and contextual communications to the attendees and similar actions that would enhance to conference or event experience.

By way of example, this embodiment can support a sponsor's ability to notify an attendee of an upcoming demonstration of the sponsor's products. At step 1300, via RFID communications on an attendee's badge, a signal is sent to a scanner with signal information identifying the conference and conference attendee. At step 1302, the trigger information is combined with geolocation and time-of-day information from scanners throughout the conference venue. At step 1304, attendee identification and context information is sent to the event clearinghouse 106. The event clearinghouse 106 recognizes the signal and context information. The clearinghouse 106 has attendee and sponsor information in the profile manager 322. The clearinghouse 106 routes the signal, sponsor information and attendee information to the matching engine 334, which determines that an attendee with the appropriate profile is in the general area of an upcoming sponsor event. At step 1306, the event clearinghouse 106 routes the action message alerting attendee of upcoming event to the consumer. In addition, the rules engine 324 executes a sponsor's rule to send a free tee shirt to the attendee if the attendee attends the sponsor's event.

Cruise Ship and Theme Park

Figure 14:
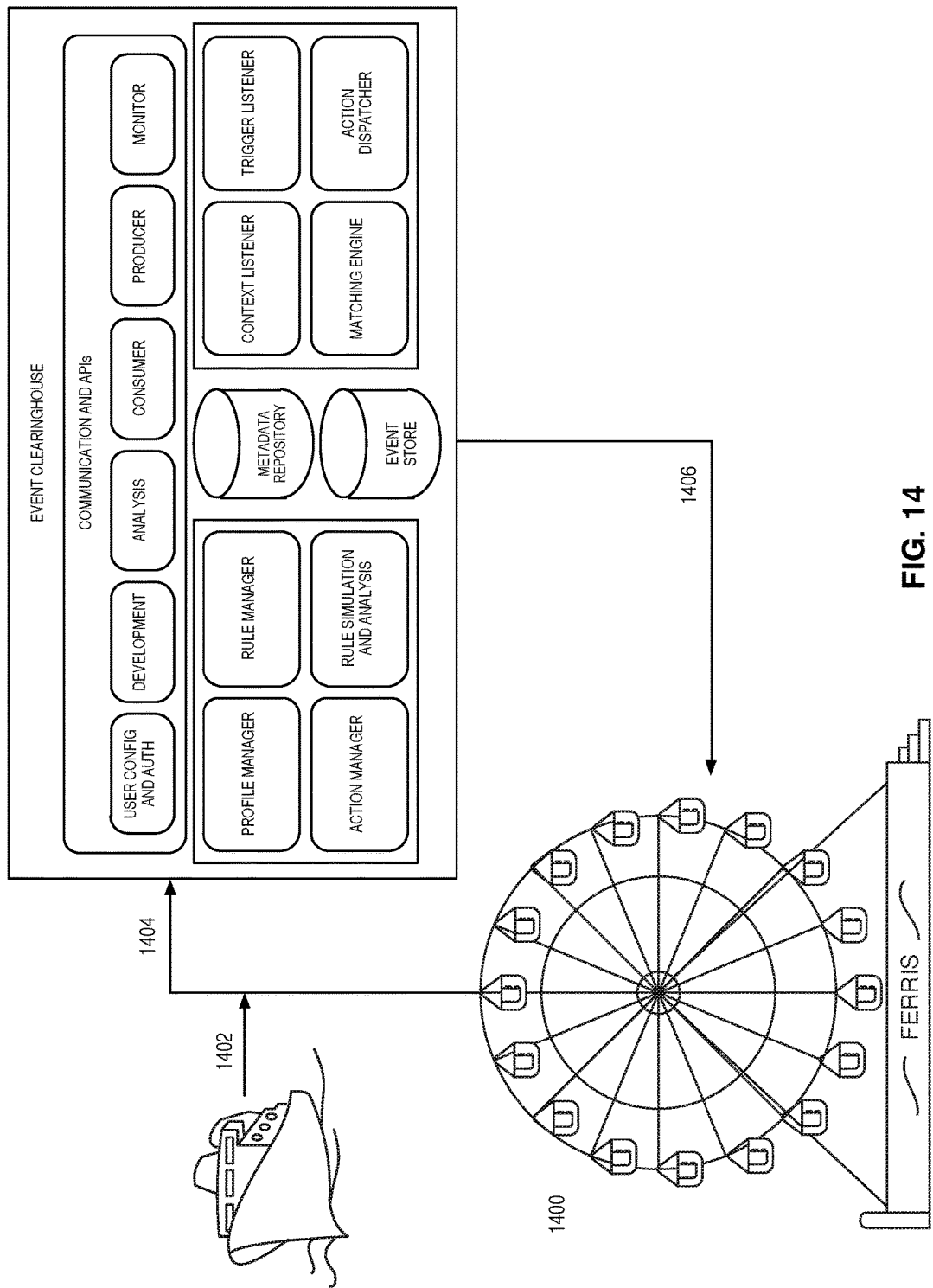
FIG. 14 is a diagram illustrating a cruise ship and theme park use case according to an embodiment of the subject matter described herein.

FIG. 14 is a diagram illustrating a theme park or cruise ship use case according to an embodiment of the subject matter described herein. In another embodiment, the clearinghouse can provide for execution of variety of activities between theme park managers and theme park attendees, between theme park attendees or between theme park-sponsored vendors and attendees. Based on a token (e.g., theme park badge or a bracelet or other token given attendees.), attendees can be identified.

Attendee information stored in the profile manager 322 identifies areas of interest to the attendee. Attendee location information can, optionally, be provided by the scanners placed throughout the theme park. The goal of attendee identification embodiment is to provide an enhanced experience to the attendee by providing opportunities to network with people of similar interest, to allow the theme park managers to alert attendees of upcoming events, to allow theme park sponsored venders to provide appropriate and contextual communications to the attendees and similar actions that would enhance the attendees experience or provide marketing opportunities for theme park sponsored vendors.

By way of example, this embodiment can support a sponsor's ability to notify attendees that lines for a particular event or ride are very short. At step 1400, via RFID communications on an attendee's badge, a signal is sent to a scanner with signal information identifying the attendee. At step 1402, the signal information is combined with geolocation and time-of-day information from scanners throughout the theme park. At step 1404 attendee identification and context information is sent to the event clearinghouse. The event clearinghouse 106 recognizes the signal and context information. The clearinghouse 106 has attendee in the profile manager 322. The clearinghouse 106 routes the signal, sponsor information and attendee information to the matching engine 334, which determines that an attendee with the appropriate profile is in the general area of a particular ride. The theme park also tracks how long lines are for particular ride. In addition, the profile manager 322 in the event clearinghouse 106 contains information about which rides the attendee is interest in. At step 1406, the event clearinghouse 106 routes the action message alerting attendee of the short line to the consumer.

Rental or Item Location Tracking

Figure 15:
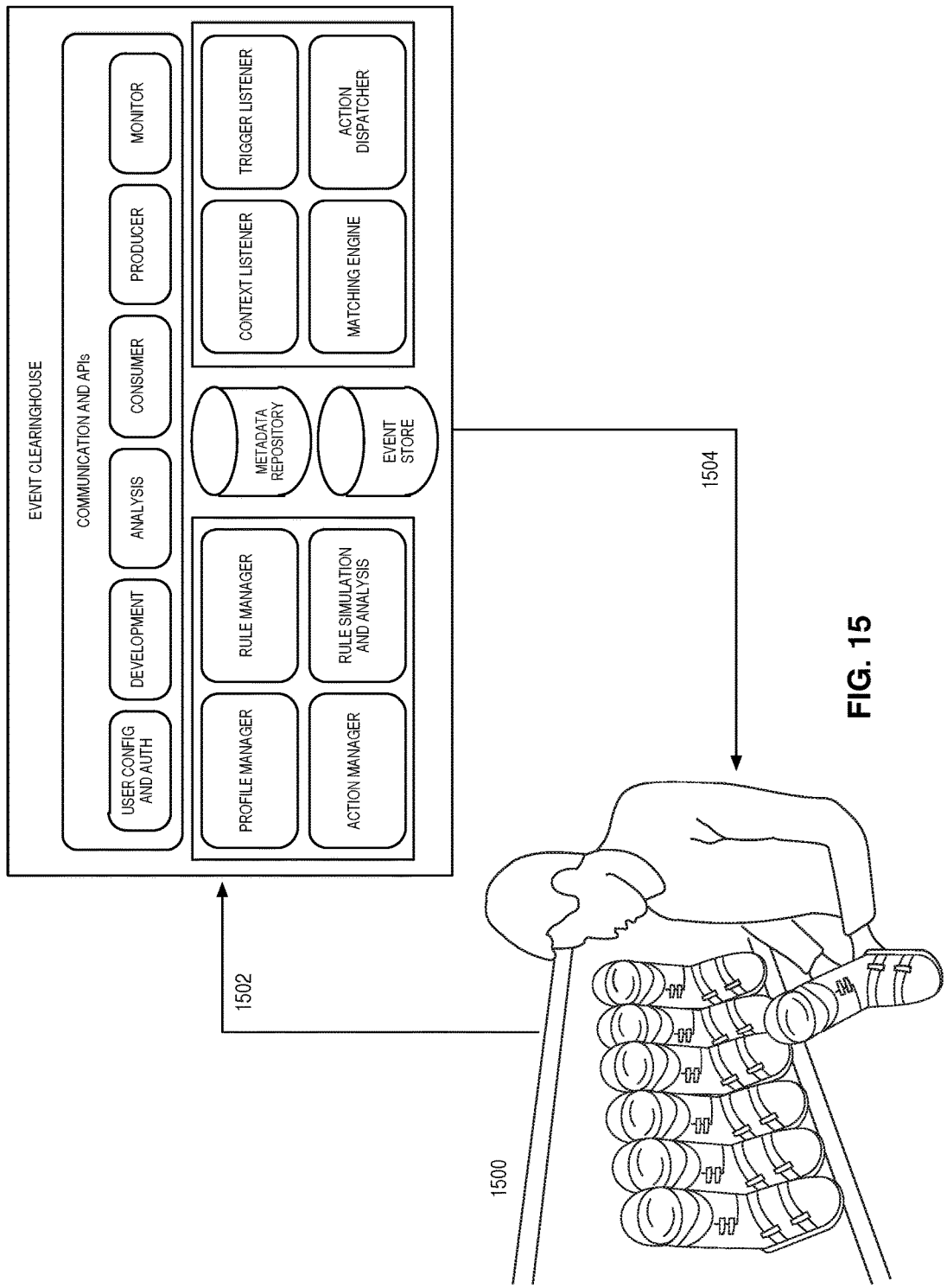
FIG. 15 is a diagram illustrating a rental item location and tracking use case according to an embodiment of the subject matter described herein.

FIG. 15 is a diagram illustrating the tagging and tracking of a use case according to an embodiment of the subject matter described herein. In another embodiment, the clearinghouse can identify the location of an item. Each item that needs to be tracked is tagged with an NFC tag (e.g., an RFID chip embedded or attached to the item.) Based on the signal of this NFC device, the item can be identified. The item would contain an item identifier and a tracker identifier. Trackers of items use a producer registration application (see FIG. 10) to register all items that they would like to have tracked. The profile manager 322 contains information of all items and trackers and information about whether or not the item is to be tracked and under what circumstances. The event clearinghouse is constantly receiving signals from a network of scanners located across a wide geographic area. These scanners can constantly be receiving trigger signals and sending trigger event and/or context event information to the event clearinghouse 106 containing signal identification and scanner geolocation information and time-of-day. When the clearinghouse 106 receives an event indicating an item to be tracked, the trigger information along with the geolocation context is sent to the rules matching engine 334. The rules matching engine 334 determines if the trigger and rule indicate that the item needs to be tracked. If so, the appropriate action is taken based on the tracker's profile information (e.g., a map on a trackers mobile device is updated to place the item at a particular location.)

By way of example, this embodiment can support a rental's company ability to track and map the location of any items that it has rented. At step 1500, each item that needs to be tracked is tagged with an NFC tag (e.g., an RFID chip embedded or attached to the item.) Based on the signal of this NFC device, the item can be identified. The item would contain an item identifier and a rental company identifier. Rental companies use a producer registration application (see FIG. 10) to register all items that they would like to have tracked. The profile manager 322 contains information of all items and rental companies and information about whether or not the item is to be tracked and under what circumstances (e.g., the rental item has been located in a geographic location that is beyond the range expected by the rental company.) At step 1502, the event clearinghouse 106 is constantly receiving signals from a network of scanners located across a wide geographic area. These scanners are constantly receiving signals and sending trigger information to the event clearinghouse containing signal identification and scanner geolocation information and time-of-day. When the clearinghouse receives a trigger indicating an item to be tracked, the trigger information along with the geolocation context is sent to the rules engine. The rules engine 334 determines if the trigger and rule indicate that the item needs to be tracked. If so, at step 1504 the appropriate action is taken based on the rental company's profile information (e.g., the tracker's location app updates information that identifies the location of all the items it currently has rented.)

Item Tracking (and Theft Prevention)

Figure 16:
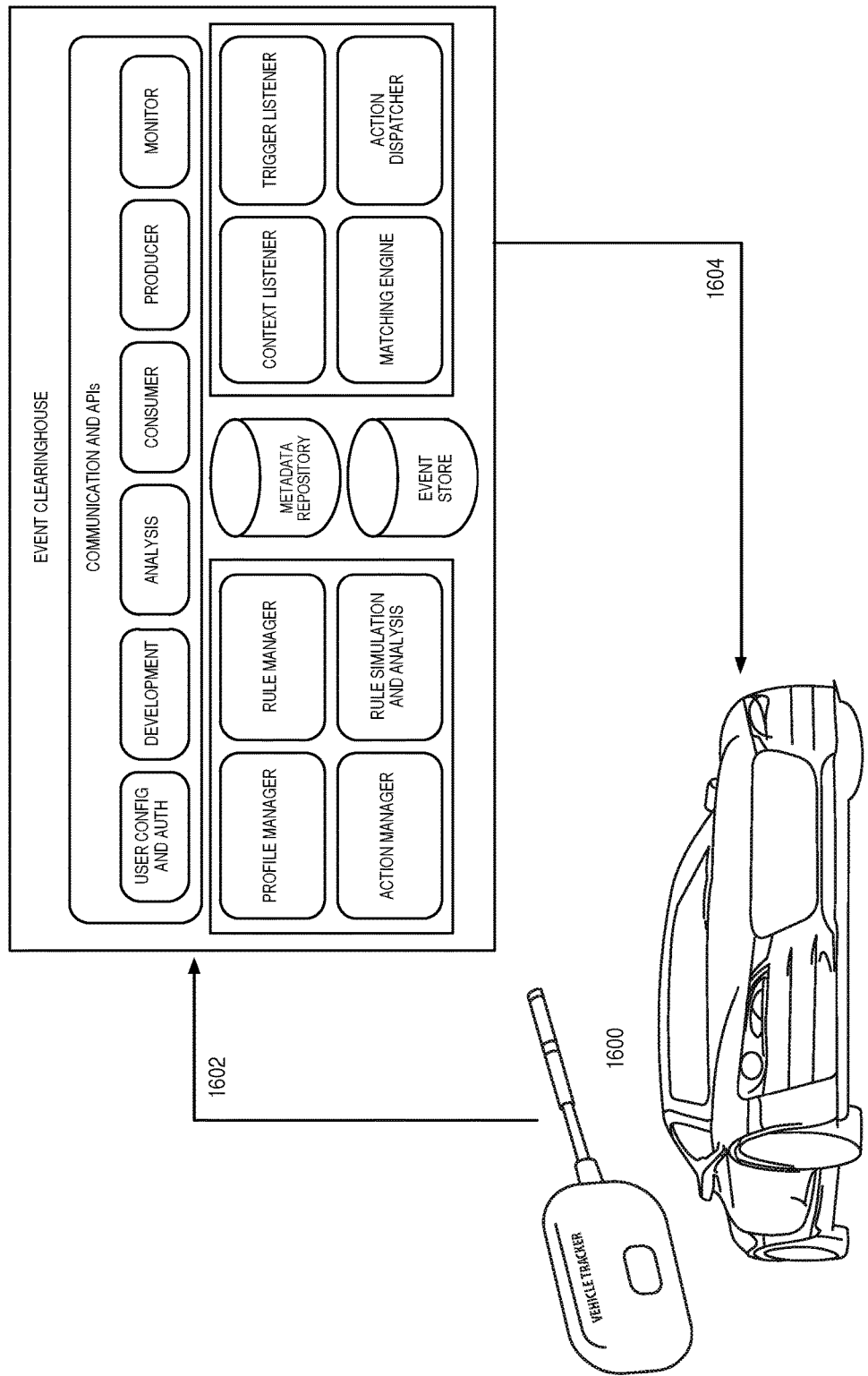
FIG. 16 is a diagram illustrating an item location and tracking for theft protection use case according to an embodiment of the subject matter described herein.

FIG. 16 is a diagram illustrating the tagging and tracking of an item for potential theft use case according to an embodiment of the subject matter described herein. In another embodiment, the clearinghouse can provide for locating items that may have been stolen. At step 1600, each item that needs to be tracked is tagged with an NFC tag (e.g., an RFID chip embedded or attached to the item. Based on the signal of this NFC device, the item can be identified. The item would contain an item identifier and an owner identifier. Owners of items use a producer registration application (see FIG. 10) to register all items that they would like to have tracked. Furthermore, in the event of an item theft, owners of the items would indicate via the registration application that an item has been stolen. The profile manager 322 contains information of all items and owners and information about whether the item has been stolen. At step

1602, the event clearinghouse 106 is constantly receiving signals from a network of scanners located across a wide geographic area. These scanners are constantly receiving trigger signals and sending event information to the event clearinghouse containing signal identification and scanner geolocation information and time-of-day. When the clearinghouse 106 receives an event that identifies an item to be tracked, the trigger information along with the geolocation context is sent to the rules engine 334. The rules engine 334 determines if a rule indicates that the item has been stolen. If so, at step 1604 the appropriate action is taken based on the owner's profile information (e.g., a message is sent to the owner or a phone call is made to the local authorities indicating that a lost item has been identified at a particular place and a particular time.

Context-Based Tracking—Wedding Registry

Figure 17:
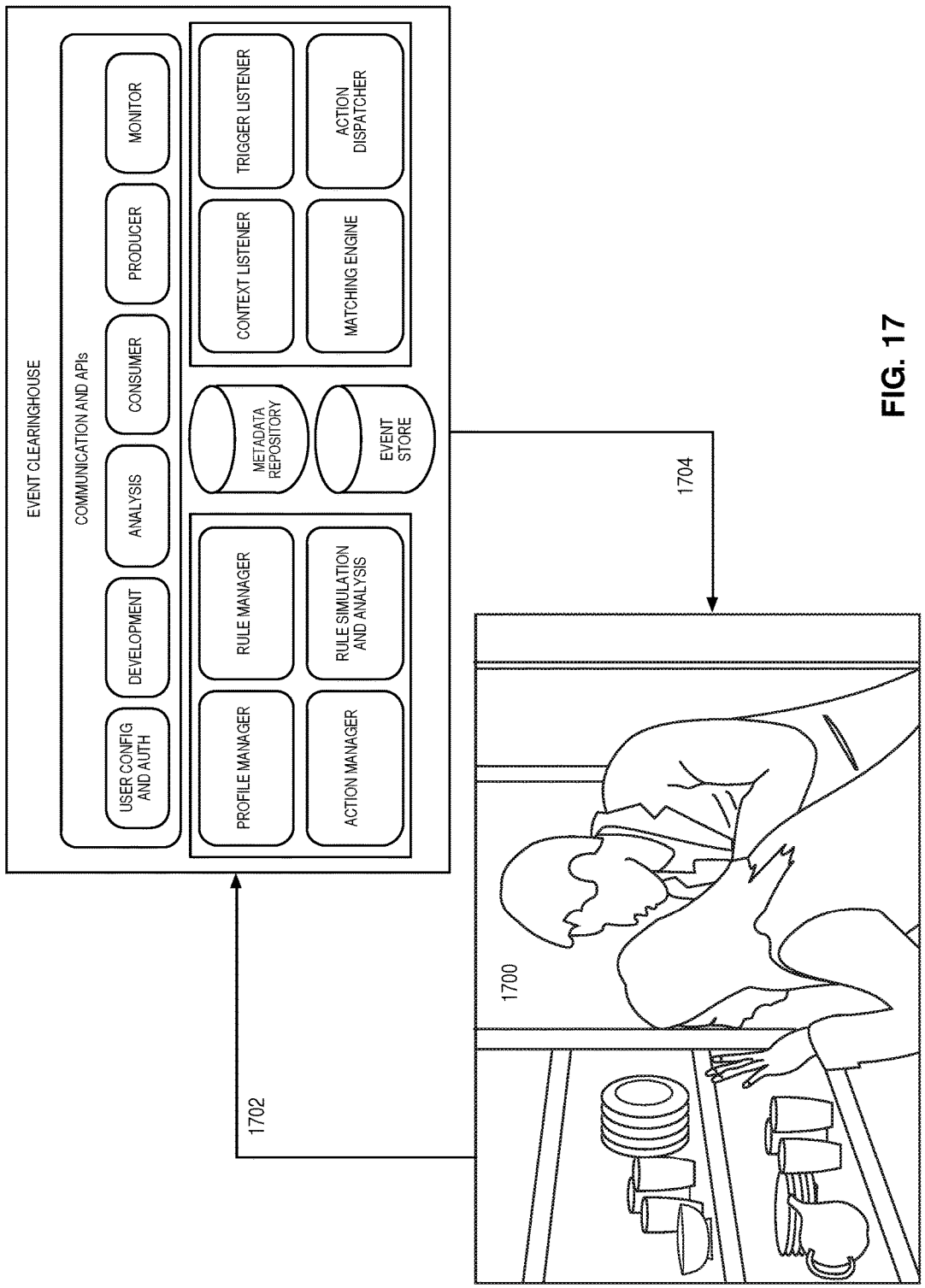
FIG. 17 is a diagram illustrating a wedding gift registry use case according to an embodiment of the subject matter described herein.

FIG. 17 is a diagram illustrating the tagging items to provide contextual information about the item to the recipient (signal consumer) use case according to an embodiment of the subject matter described herein. In another embodiment, the clearinghouse 106 can provide information in the context of the recipient, via a device that communicates with the clearinghouse (e.g. a portable phone) provides information about the consumer's location. The clearinghouse 106 captures that information along with other trigger signals in the general area. Information in the clearinghouse profile provides context about the specific activities and events that are pertinent to the consumer. Based on trigger information, the consumer location information and the context information, the appropriate action is triggered from the clearinghouse.

By way of example, the embodiment can support aiding a wedding invitee in buying a wedding gift. At step 1700, in a department store, areas are tagged with an NFC tag (e.g., an RFID chip.) Based on the signal of this NFC device, the item can be identified. The item may contain an item identifier. Shoppers running a wedding registry app would register important profile information via the producer app (wedding registry app.) The registration may consist of the name of the couple getting married and the name of the wedding attendee, as well as other information that will help determine an appropriate gift (e.g., price range the wedding is willing to spend). Additionally, the couple that is getting married may use the registration app to enter the specific items that they are interested in as wedding gifts along with additional pertinent information (e.g., in what stores is the item available.) As the wedding invitee browses through the store, the wedding registry app on the invitee's device (e.g., mobile device) acts as a scanner and receives the signals coming from tagged areas in the store. The scanner receives the signal and adds geolocation within the store information to the clearinghouse. At step 1702, the clearinghouse sends the geolocation information and the trigger information to the clearinghouse 106 where it is combined with the profile information of the shopper (wedding invitee) and the registry information of the couple getting married. In response, at step 1704, when the shopper is in the general area of items that might be of interest based on the shopper profile information and the registry information, a message is sent to the registry app indicating the name, location, and price of the item. In addition, the message could send additional information; for example, if the item had already been purchased for the couple.

The description and drawings presented herein are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method for dynamic execution of actions in response to communications events of one or more communications protocols that are generated in response to a variety of triggers, the method comprising:
   at an event clearinghouse for receiving communications events:
   receiving a communications event that is associated with a trigger, wherein the trigger is generated in response to proximity of a target device to a reader;
   identifying an action to take in response to the communications event;
   identifying the target device for the action; and
   initiating the identified action by or on behalf of the identified target,
   wherein the event clearinghouse is configured for communicating over multiple communication mediums,
   wherein the target device is a mobile device carried by a user.

2. The method of claim 1 comprising receiving, at the event clearinghouse, a communications event that contains contextual information and using the contextual information to identify the action and/or the target device for the action, and wherein the contextual information includes at least one of: location information, manufacturer information, product data, social networking information, and demographic information.

3. The method of claim 1 wherein the event clearinghouse is used to dynamically trigger actions associated with social networking, and identifying a target device for an action includes identifying a set of people that have expressed one or more common interests or a set of people that meet a set of criteria.

4. The method of claim 3 wherein the identified action includes at least one of:
   notifying a set of people that they have expressed a common interest; and
   notifying a person of the existence or location of another person meeting a set of criteria.

5. The method of claim 1 wherein the event clearinghouse is used to dynamically trigger actions associated with retail and receiving a communications event includes receiving information about a location, preference, or purchase of a consumer.

6. The method of claim 1 wherein identifying a target device includes identifying a consumer based on consumer profile information and advertiser profile information.

7. The method of claim 1 wherein the event clearinghouse is used to dynamically trigger events associated with providing retail product support and receiving a communications event includes receiving signals from a device embedded in an article of retail.

8. The method of claim 7 wherein identifying a target device for an action includes identifying a consumer who might be interested in the article of retail.

9. The method of claim 6 wherein initiating an action includes notifying an identified consumer about at least one of a style, a color, and a nearest retail outlet associated with an article of clothing and the action includes providing product support or documentation to enhance an initial experience with a new customer and/or new product for a predetermined time period after purchase.

10. An event clearinghouse for receiving communications events, comprising:
    a memory and a processor, the processor configured for:
    receiving a communications event that is associated with a trigger, wherein the trigger is generated in response to proximity of a target device to a reader;
    identifying an action to take in response to the communications event;
    identifying the target device for the action; and
    initiating the identified action by or on behalf of the identified target,
    wherein the event clearinghouse is configured for communicating over multiple communication mediums,
    wherein the target device is a mobile device carried by a user.

11. The event clearinghouse of claim 10, wherein the processor is configured for receiving a communications event that contains contextual information and using the contextual information to identify the action and/or the target device for the action, and wherein the contextual information includes at least one of: location information, manufacturer information, product data, social networking information, and demographic information.

12. The event clearinghouse of claim 10, wherein the processor is configured for dynamically triggering actions associated with social networking, and identifying a target device for an action includes identifying a set of people that have expressed one or more common interests or a set of people that meet a set of criteria.

13. The event clearinghouse of claim 12, wherein the identified action includes at least one of:
    notifying a set of people that they have expressed a common interest; and
    notifying a person of the existence or location of another person meeting a set of criteria.

14. The event clearinghouse of claim 10, wherein the processor is configured for dynamically triggering actions associated with retail and receiving a communications event includes receiving information about a location, preference, or purchase of a consumer.

15. The event clearinghouse of claim 10, wherein identifying a target device includes identifying a consumer based on consumer profile information and advertiser profile information.

16. The event clearinghouse of claim 10, wherein the processor is configured for dynamically triggering events associated with providing retail product support and receiving a communications event includes receiving signals from a device embedded in an article of retail.

17. The event clearinghouse of claim 16, wherein identifying a target device for an action includes identifying a consumer who might be interested in the article of retail.

18. The event clearinghouse of claim 15 wherein initiating an action includes notifying an identified consumer about at least one of a style, a color, and a nearest retail outlet associated with an article of clothing and the action includes providing product support or documentation to enhance an initial experience with a new customer and/or new product for a predetermined time period after purchase.

* * * * *